United States Patent [19]

Helliwell et al.

[11] 4,133,979
[45] Jan. 9, 1979

[54] MULTIFREQUENCY SENDER/RECEIVER IN A MULTI-TIME SLOT DIGITAL DATA STREAM

[75] Inventors: Bradley A. Helliwell; James R. Baichtal, both of Los Gatos, Calif.

[73] Assignee: TRW, Inc., Los Angeles, Calif.

[21] Appl. No.: 762,809

[22] Filed: Jan. 26, 1977

[51] Int. Cl.² .............................................. H04J 3/12
[52] U.S. Cl. ............................ 179/15 BY; 179/84 UF
[58] Field of Search ......... 179/15 AT, 15 BY, 84 UF

[56] References Cited

U.S. PATENT DOCUMENTS

| | | | |
|---|---|---|---|
| 3,801,746 | 4/1974 | Buchner | 179/15 BY |
| 3,870,826 | 3/1975 | Carbrey | 179/15 BY |
| 3,936,611 | 2/1976 | Poole | 179/84 UF |
| 3,959,596 | 5/1976 | Botanek | 179/15 AQ |
| 3,961,167 | 6/1976 | Mills | 179/15 BY |
| 3,985,965 | 10/1976 | Field | 179/15 BY |

Primary Examiner—David L. Stewart
Attorney, Agent, or Firm—Flehr, Hohbach, Test, Albritton & Herbert

[57] ABSTRACT

A multifrequency sender/receiver in a telephone system operating in time frames each including a plurality of time slots, including a sender for generating and connecting selected multifrequency tone signals in pulse code modulated format to a first group of the time slots. The receiver is responsive to the presence of a multifrequency tone in a second group of the time slots and provides a data signal representative of the tone signal present. Control means specify the selected tone signals to be sent in the first group of time slots.

10 Claims, 16 Drawing Figures

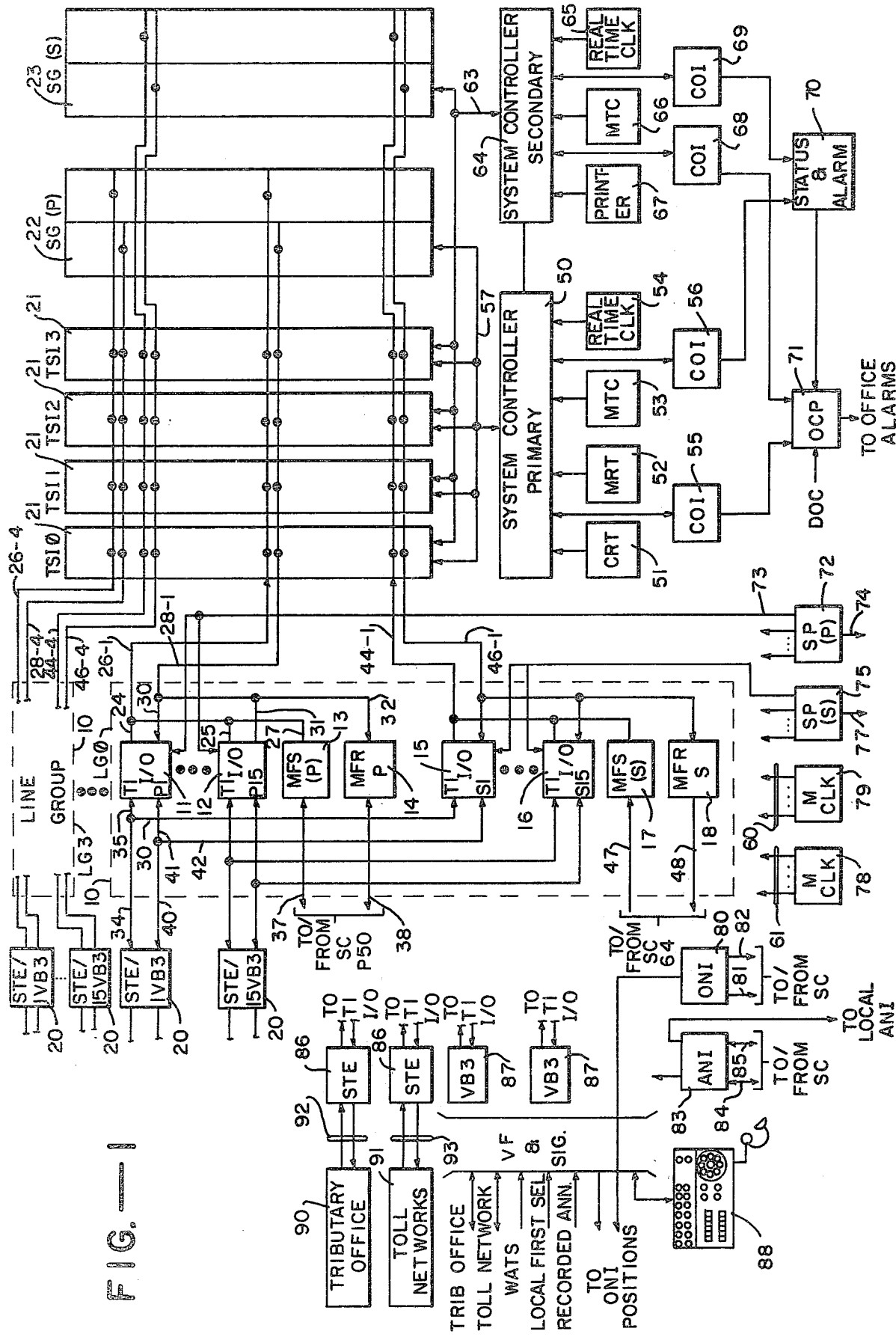
FIG.—1

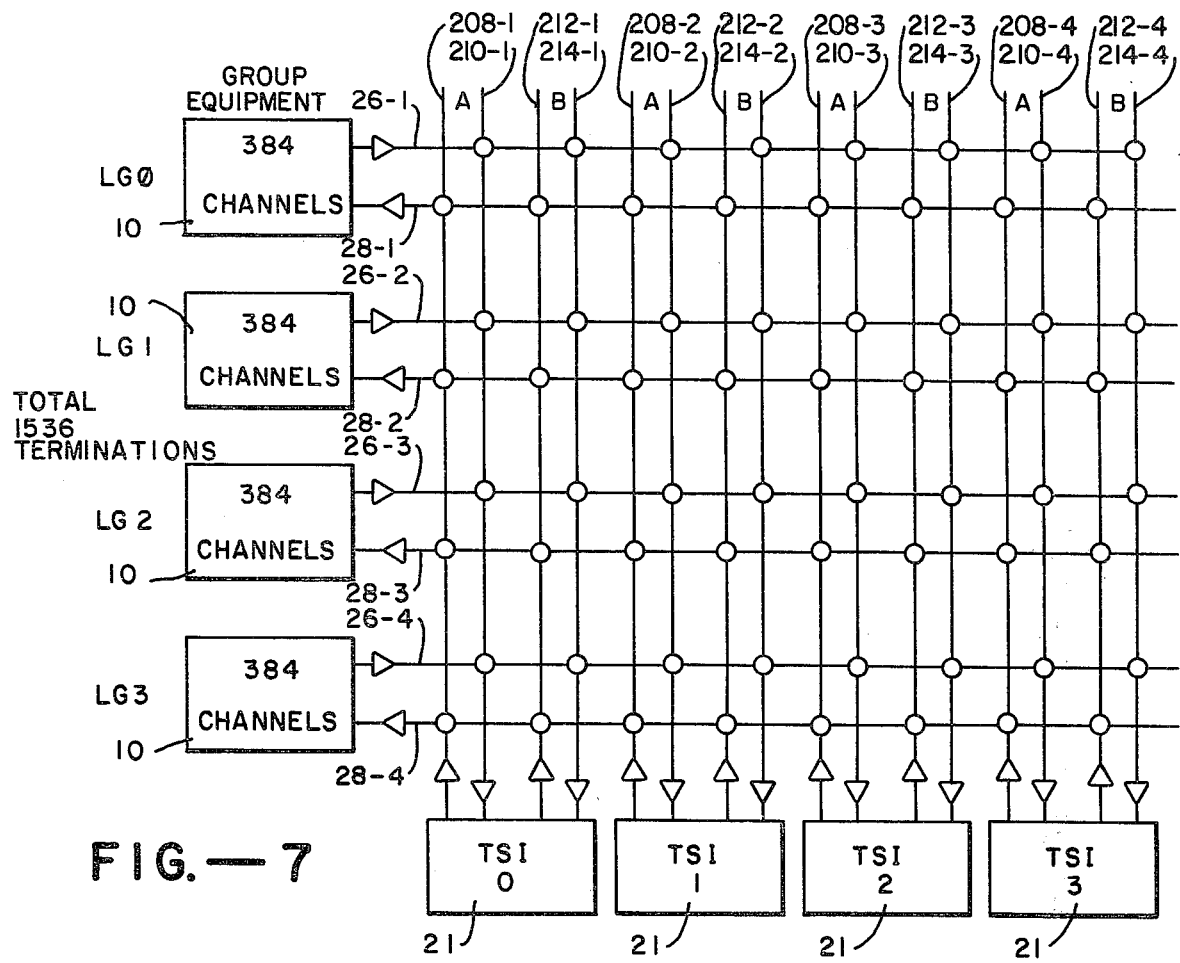
FIG.—7
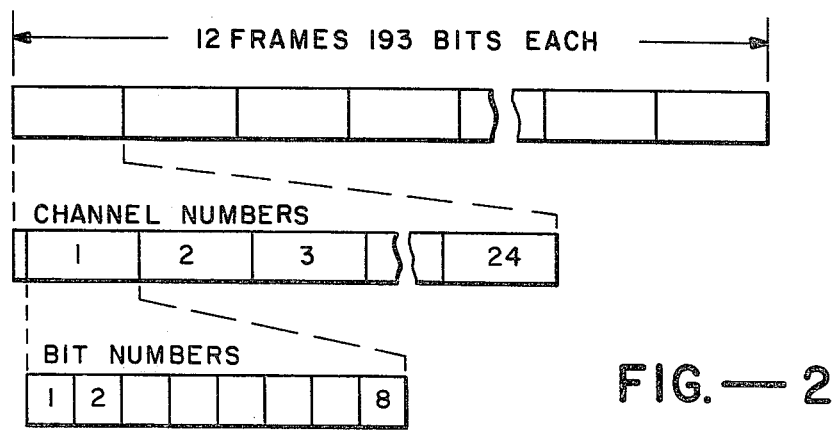
FIG.—2
| FRAME NUMBER | 1 | 2 | 3 | 4 | 5 | 6 | 7 | 8 | 9 | 10 | 11 | 12 |
|---|---|---|---|---|---|---|---|---|---|---|---|---|
| FRAME BIT | 1 | 0 | 0 | 0 | 1 | 1 | 0 | 1 | 1 | 1 | 0 | 0 |
FIG.—3

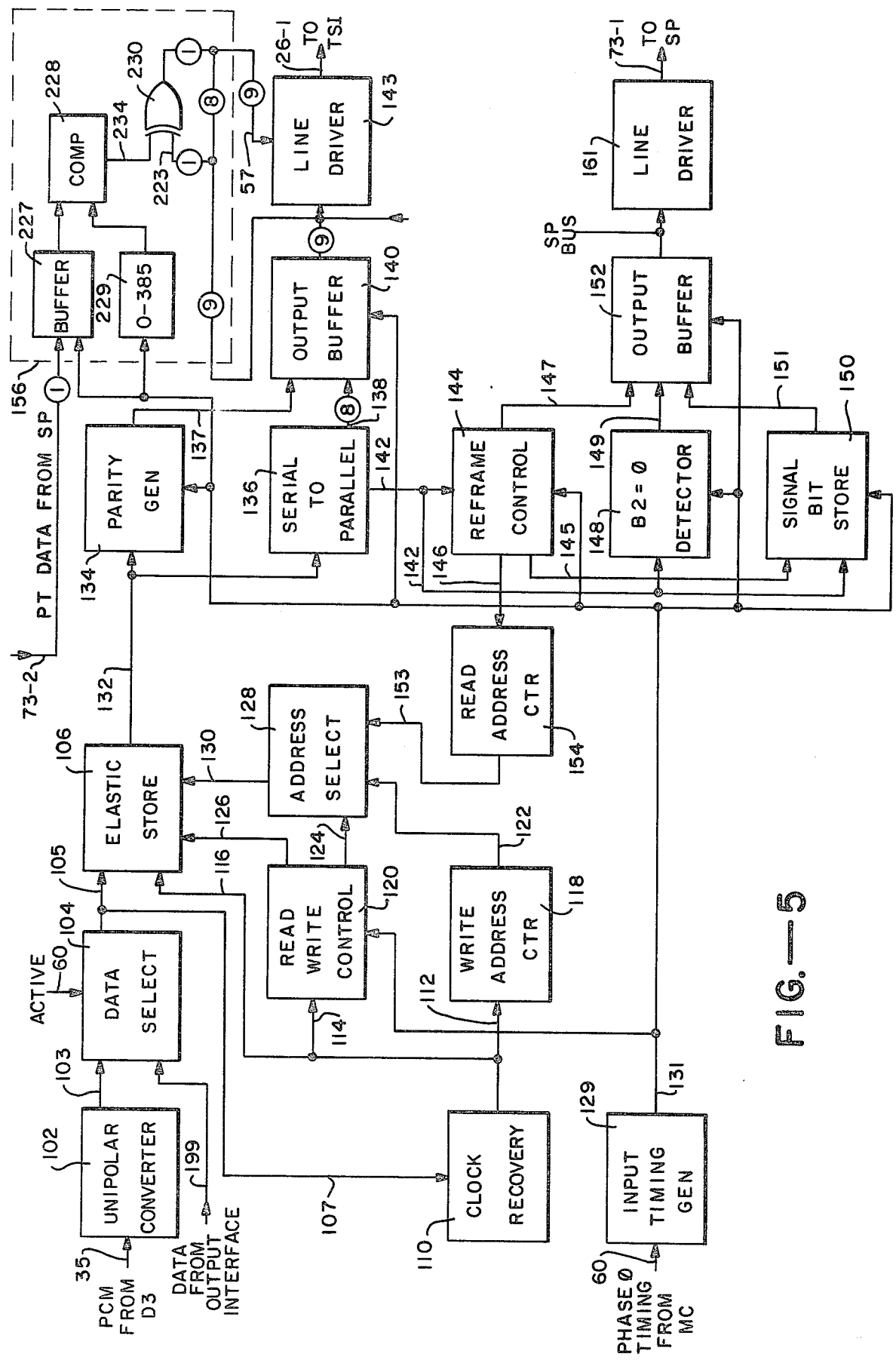
FIG.—5

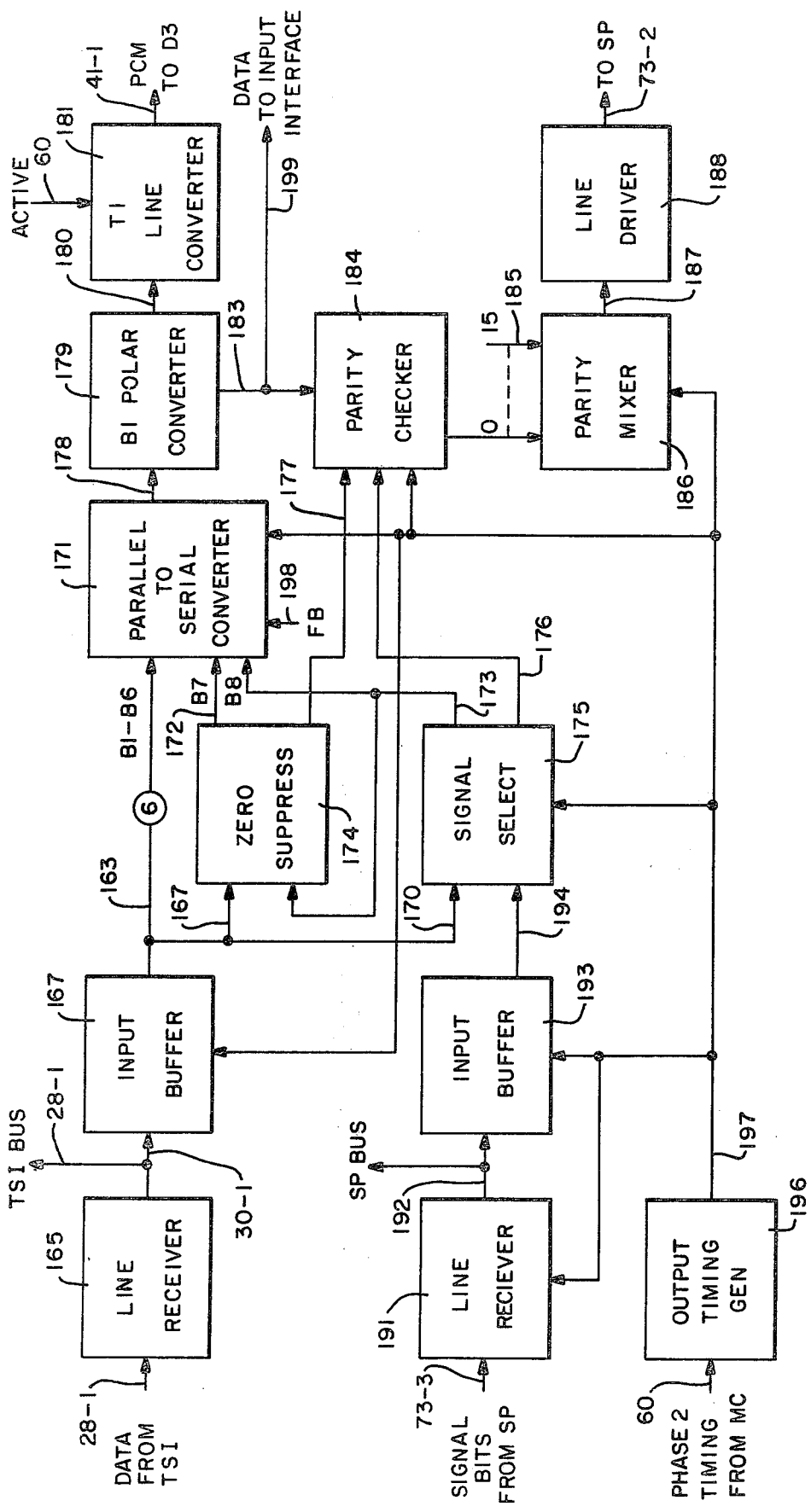
FIG.—6

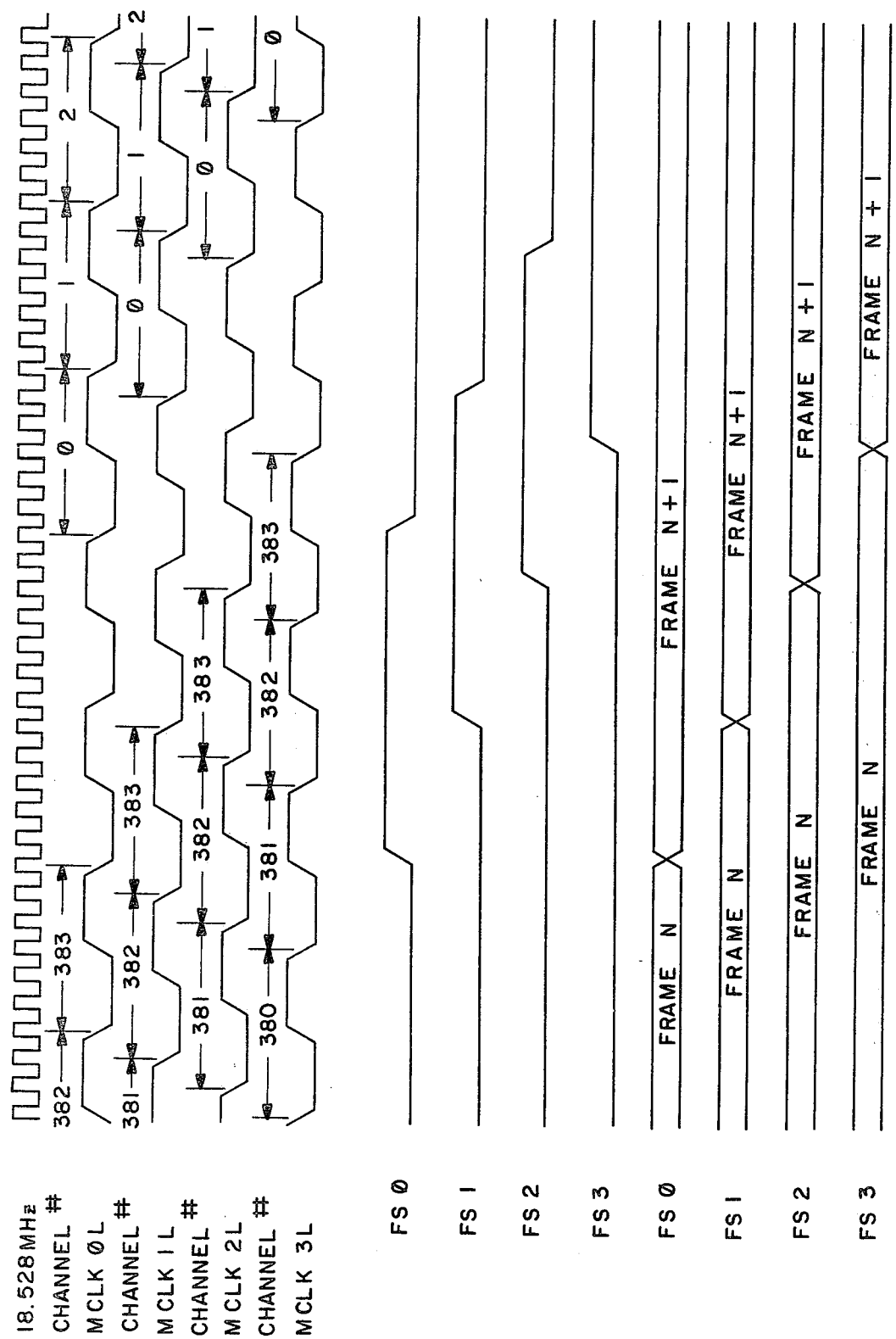
FIG.—8

| UART BIT | 8 | 7 | 6 | 5 | 4 | 3 | 2 | 1 | MFS CHAN # |
|---|---|---|---|---|---|---|---|---|---|
| | P | 0 | X | X | X | X | X | X | |
| | 1 | 0 | | | 0 | 0 | 0 | 0 | 0 |
| | 0 | 0 | N | | 0 | 0 | 0 | 1 | 1 |
| | 0 | 0 | O | | 0 | 0 | 1 | 0 | 2 |
| | 1 | 0 | T | | 0 | 0 | 1 | 1 | 3 |
| BYTE 0 | 0 | 0 | U | | 0 | 1 | 0 | 0 | 4 |
| | 1 | 0 | S | | 0 | 1 | 0 | 1 | 5 |
| (FROM SC) | 1 | 0 | E | | 0 | 1 | 1 | 0 | 6 |
| | 0 | 0 | D | | 0 | 1 | 1 | 1 | 7 |
| | 0 | 0 | A | | 1 | 0 | 0 | 0 | 8 |
| | 1 | 0 | L | | 1 | 0 | 0 | 1 | 9 |
| | 1 | 0 | L | | 1 | 0 | 1 | 0 | 10 |
| | 0 | 0 | 0 | | 1 | 0 | 1 | 1 | 11 |
| | 1 | 0 | | | 1 | 1 | 0 | 0 | 12 |
| | 0 | 0 | | | 1 | 1 | 0 | 1 | 13 |
| | 0 | 0 | | | 1 | 1 | 1 | 0 | 14 |
| | 1 | 0 | | | 1 | 1 | 1 | 1 | 15 |

P = ODD PARITY $f_1 = 700$ Hz
$f_2 = 900$ Hz
$f_3 = 1100$ Hz
$f_4 = 1300$ Hz
$f_5 = 1500$ Hz
$f_6 = 1700$ Hz

| | 8 | 7 | 6 | 5 | 4 | 3 | 2 | 1 | TONE PAIR $F_B + F_A$ | CHARACTER TO BE SENT |
|---|---|---|---|---|---|---|---|---|---|---|
| | P | 1 | X | X | X | X | X | X | | |
| | | | $F_B$ | | | $F_A$ | | | | |
| | 0 | 1 | 0 | 0 | 0 | 0 | 0 | 0 | NONE | BLANK |
| | 0 | 1 | 0 | 0 | 1 | 0 | 1 | 0 | $f_1 + f_2$ | 1 |
| | 1 | 1 | 0 | 0 | 1 | 0 | 1 | 1 | $f_1 + f_3$ | 2 |
| | 1 | 1 | 0 | 1 | 0 | 0 | 1 | 1 | $f_2 + f_3$ | 3 |
| | 0 | 1 | 0 | 0 | 1 | 1 | 0 | 0 | $f_1 + f_4$ | 4 |
| BYTE 1 | 0 | 1 | 1 | 0 | 0 | 0 | 1 | 0 | $f_4 + f_2$ | 5 |
| | 1 | 1 | 0 | 1 | 1 | 1 | 0 | 0 | $f_3 + f_4$ | 6 |
| (FROM SC) | 1 | 1 | 1 | 0 | 1 | 0 | 0 | 1 | $f_5 + f_1$ | 7 |
| | 1 | 1 | 0 | 1 | 0 | 0 | 0 | 1 | $f_2 + f_5$ | 8 |
| | 0 | 1 | 0 | 1 | 1 | 1 | 0 | 1 | $f_3 + f_5$ | 9 |
| | 1 | 1 | 1 | 0 | 1 | 1 | 0 | 0 | $f_5 + f_4$ | 0 |
| | 1 | 1 | 1 | 1 | 0 | 0 | 0 | 1 | $f_6 + f_1$ | ST3P |
| | 1 | 1 | 0 | 1 | 0 | 1 | 1 | 0 | $f_2 + f_6$ | STP |
| | 0 | 1 | 1 | 1 | 0 | 0 | 1 | 1 | $f_6 + f_3$ | KP |
| | 1 | 1 | 1 | 0 | 0 | 1 | 1 | 0 | $f_4 + f_6$ | ST2P |
| | 0 | 1 | 1 | 0 | 1 | 1 | 1 | 0 | $f_5 + f_6$ | ST |
| "GO" (TO SC) | 1 | 0 | 0 | 0 | 0 | 0 | 0 | 0 | | |
| "NO-GO" (TO SC) | 0 | 0 | 0 | 0 | 0 | 0 | 0 | 1 | | |

FIG.—9

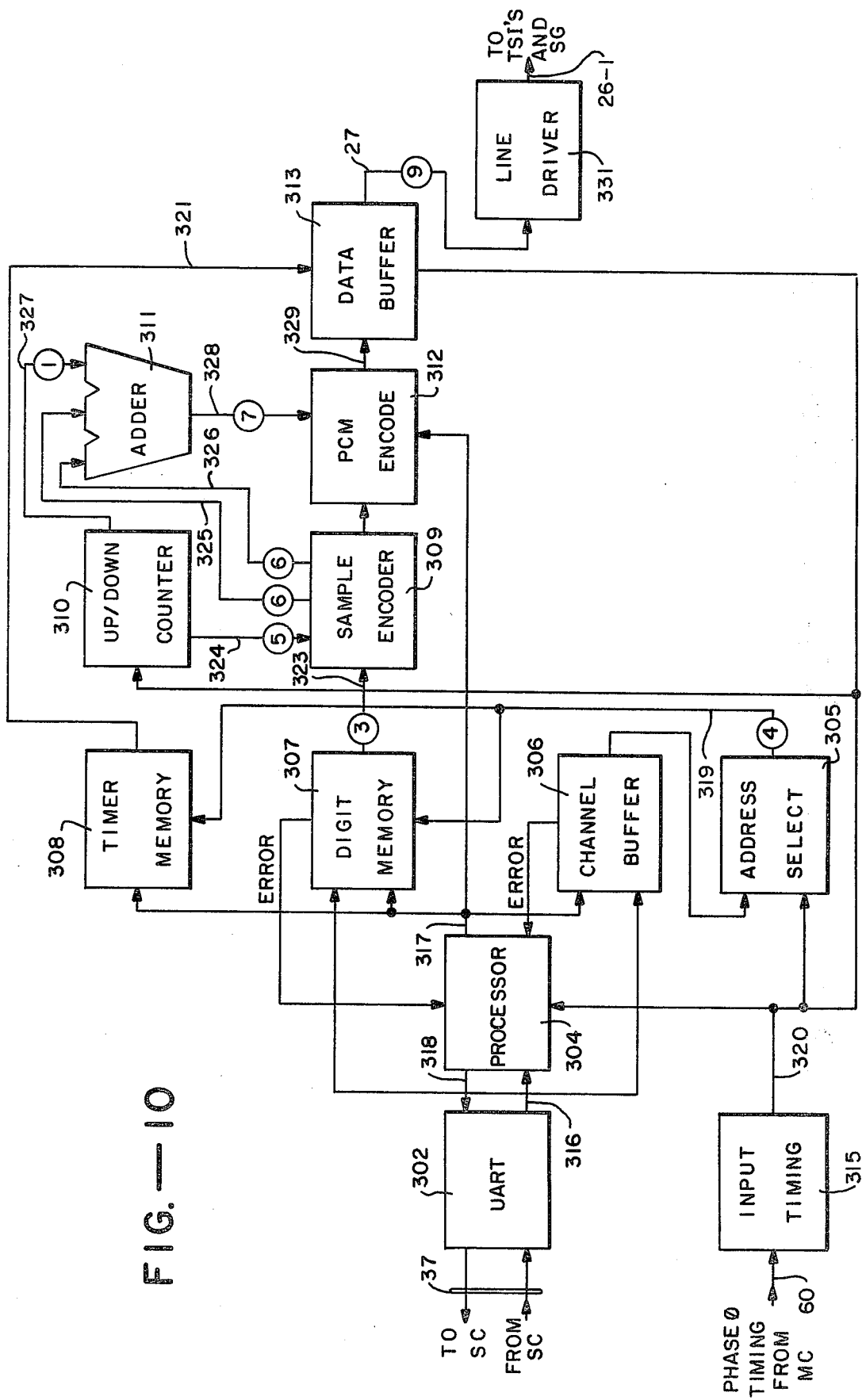
FIG.—10

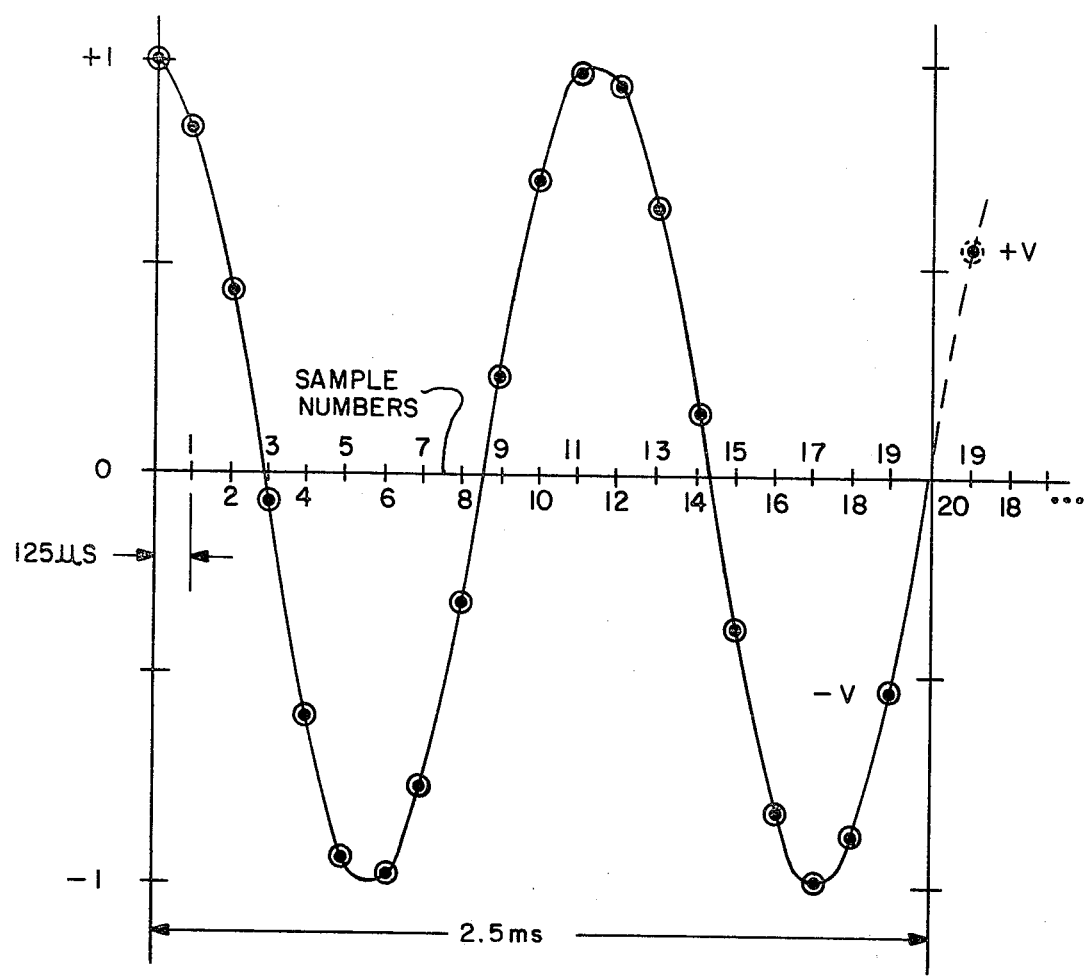
FIG.—11

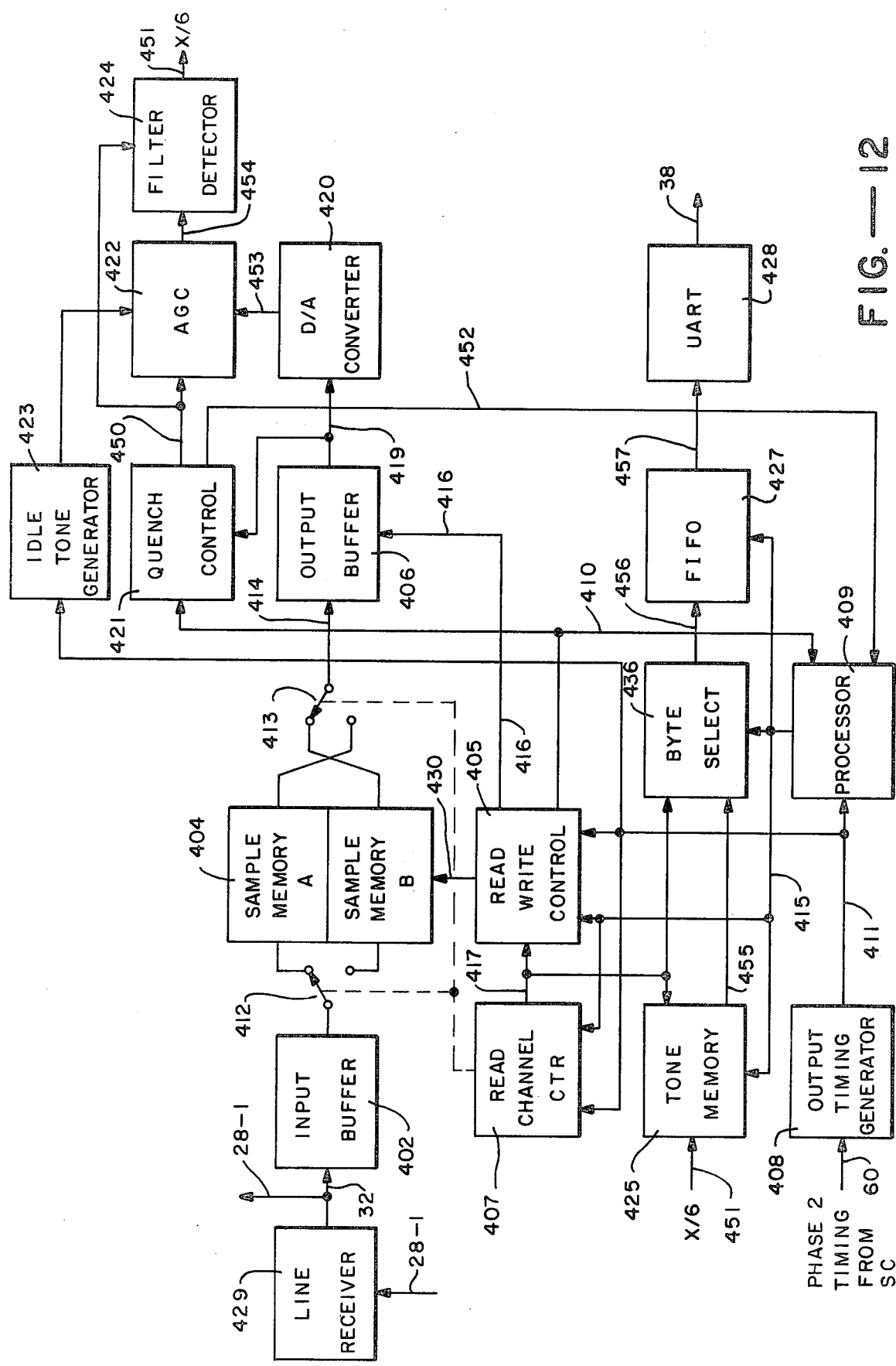

| UART BIT | 8 | 7 | 6 | 5 | 4 | 3 | 2 | 1 |
|---|---|---|---|---|---|---|---|---|
| BYTE 0 | 0 | PE | $f_6$ | $f_5$ | $f_4$ | $f_3$ | $f_2$ | $f_1$ |

"1" = TONE PRESENT
0 = TONE ABSENT
$f_1$ = 700 Hz
$f_2$ = 900 Hz
$f_3$ = 1100 Hz
$f_4$ = 1300 Hz
$f_5$ = 1500 Hz
$f_6$ = 1700 Hz

PE: "1" = PARITY ERROR

| UART BIT | 8 | 7 | 6 | 5 | 4 | 3 | 2 | 1 | MFR CH. # |
|---|---|---|---|---|---|---|---|---|---|
| BYTE 1 | 1 | NOT USED ALL ZEROS | | | 0 | 0 | 0 | 0 | 0 |
| | 1 | | | | 0 | 0 | 0 | 1 | 1 |
| | 1 | | | | 0 | 0 | 1 | 0 | 2 |
| | 1 | | | | 0 | 0 | 1 | 1 | 3 |
| | 1 | | | | 0 | 1 | 0 | 0 | 4 |
| | 1 | | | | 0 | 1 | 0 | 1 | 5 |
| | 1 | | | | 0 | 1 | 1 | 0 | 6 |
| | 1 | | | | 0 | 1 | 1 | 1 | 7 |
| | 1 | | | | 1 | 0 | 0 | 0 | 8 |
| | 1 | | | | 1 | 0 | 0 | 1 | 9 |
| | 1 | | | | 1 | 0 | 1 | 0 | 10 |
| | 1 | | | | 1 | 0 | 1 | 1 | 11 |
| | 1 | | | | 1 | 1 | 0 | 0 | 12 |
| | 1 | | | | 1 | 1 | 0 | 1 | 13 |
| | 1 | | | | 1 | 1 | 1 | 0 | 14 |
| | 1 | | | | 1 | 1 | 1 | 1 | 15 |

FIG.—13

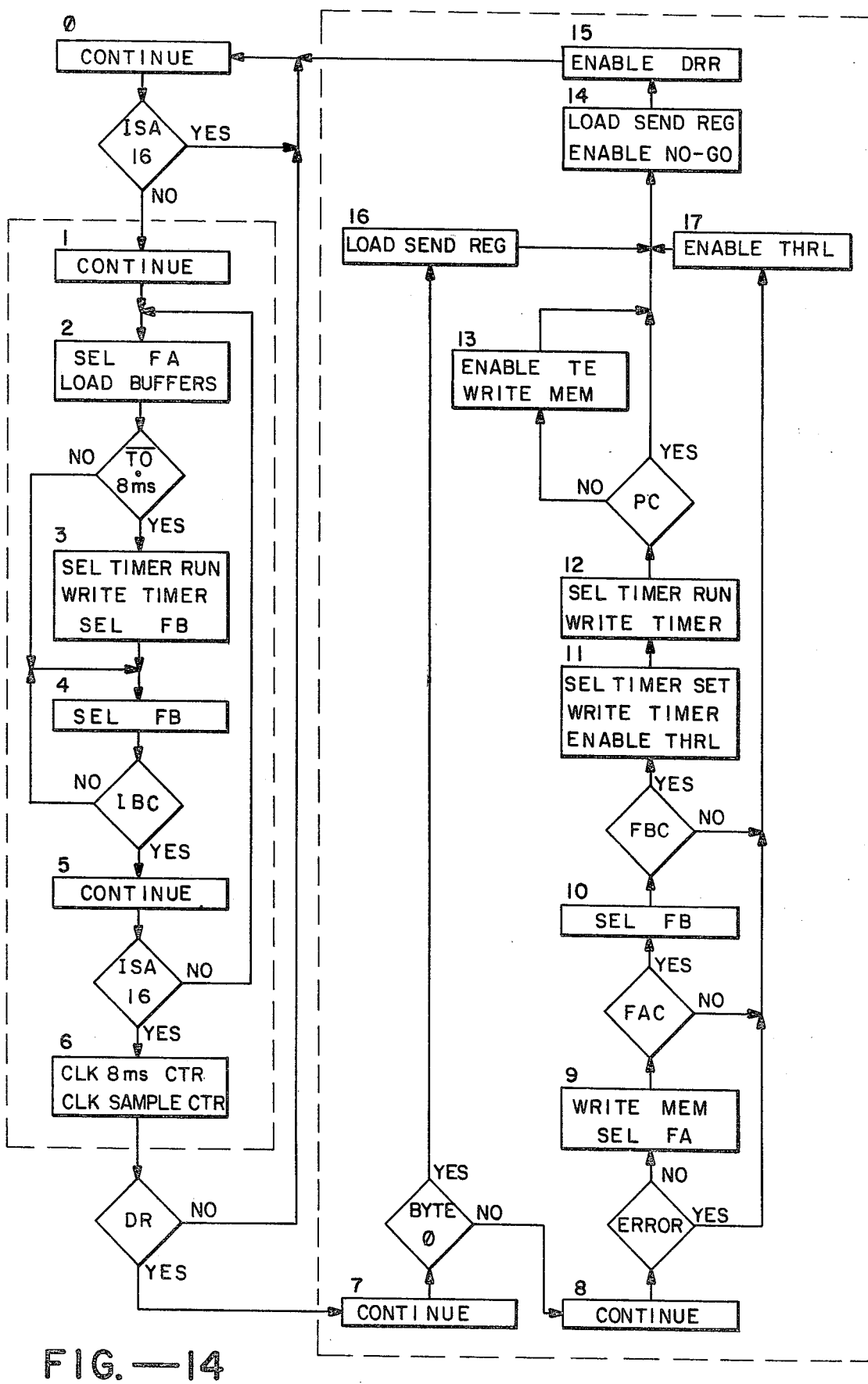
FIG.—14

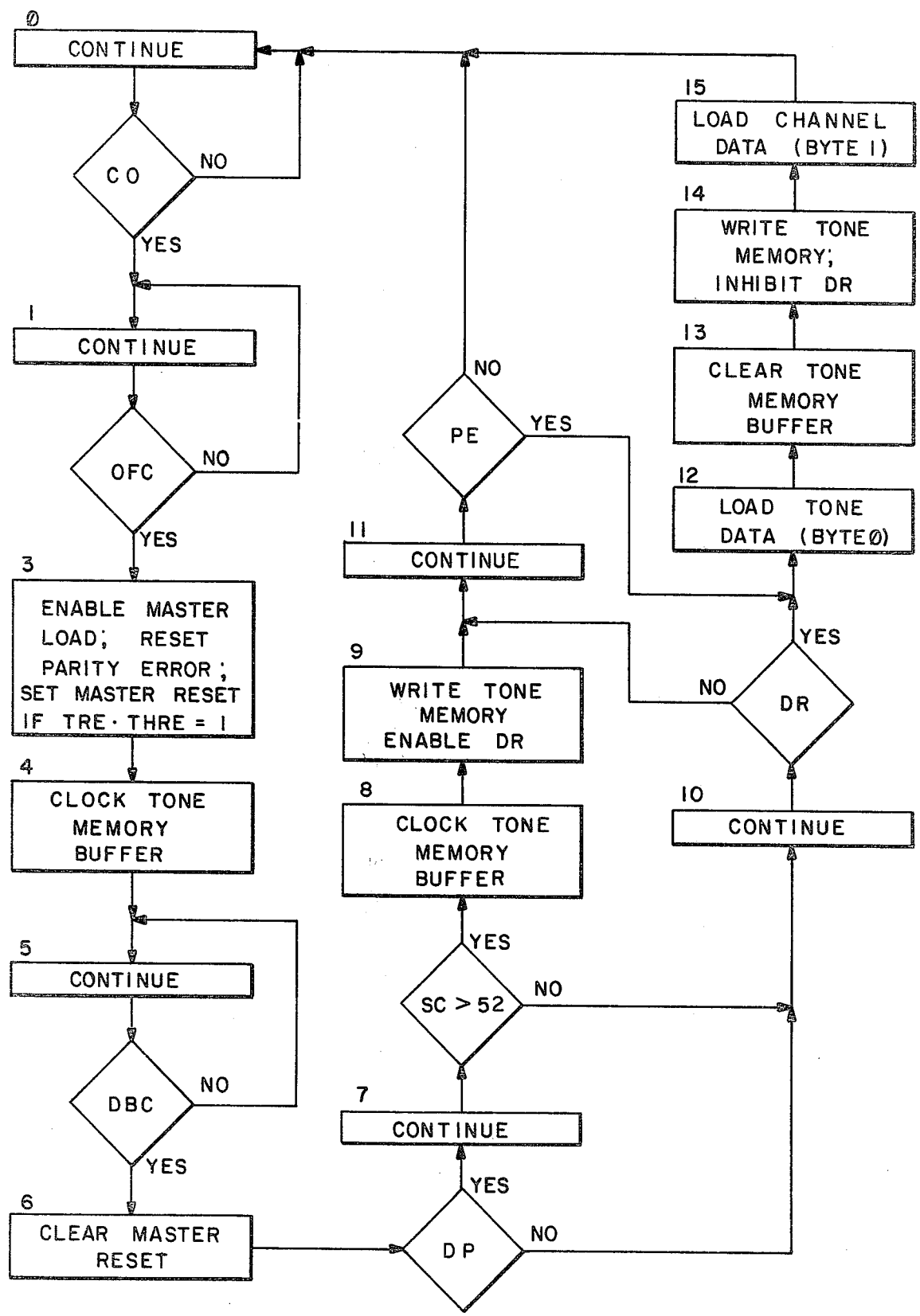
FIG.—15

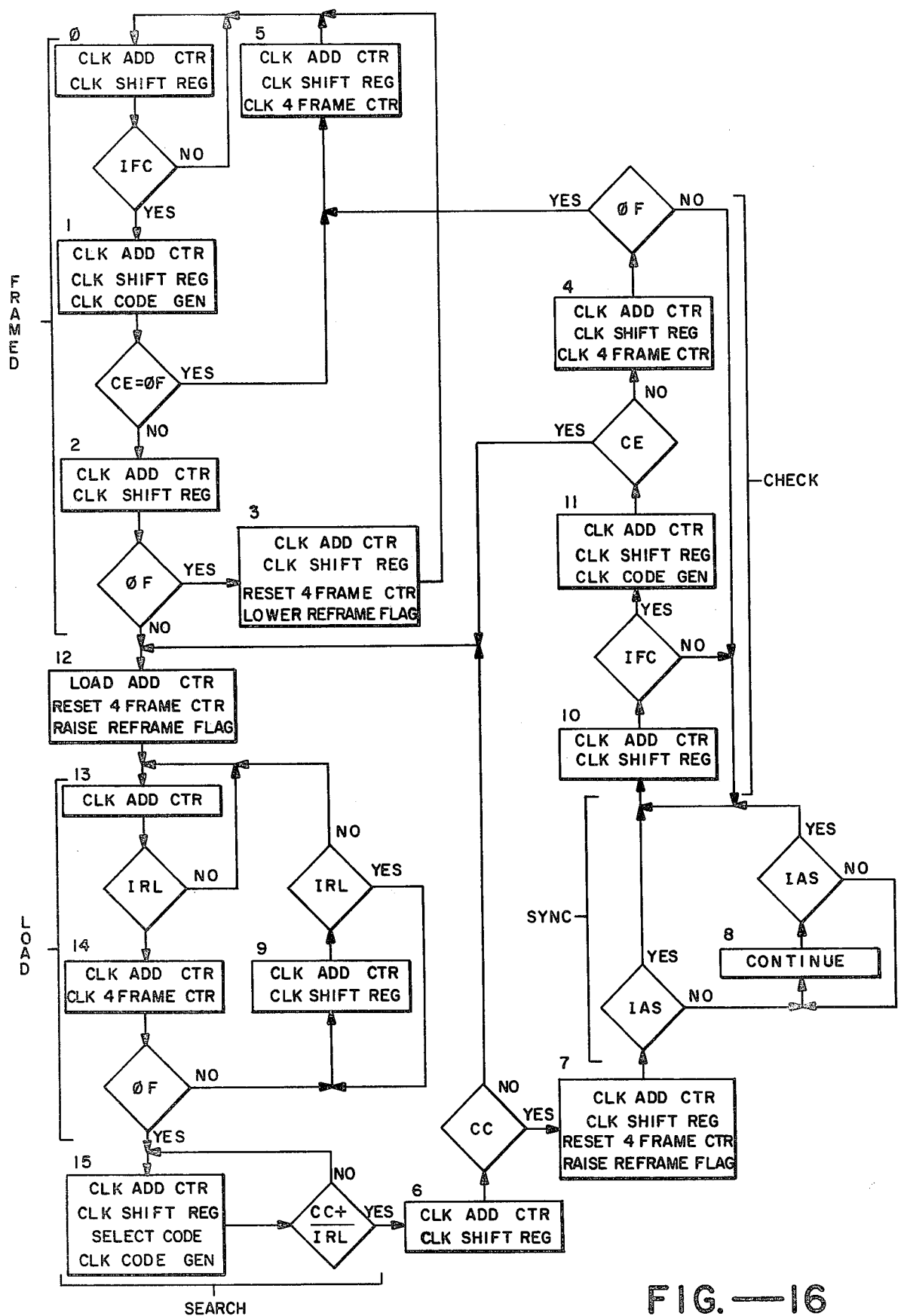
FIG.—16

MULTIFREQUENCY SENDER/RECEIVER IN A MULTI-TIME SLOT DIGITAL DATA STREAM

CROSS REFERENCE TO RELATED APPLICATIONS

1. INTEGRATED MESSAGE ACCOUNTING SYSTEM, Ser. No. 781,348, filed Mar. 25, 1977, invented by John C. McDonald and James R. Baichtal, and assigned to the same assignee of the present invention.
2. TIME SLOT INTERCHANGER, Ser. No. 762,811, filed Jan. 26, 1977, now U.S. Pat. No. 4,071,703, issued Jan. 31, 1978 invented by Craig Schaffter, and assigned to the same assignee of the present invention.
3. REGISTER/SENDER, Ser. No. 762,801, filed Jan. 26, 1977, invented by Johannes R. Moed, and assigned to the same assignee of the present invention.
4. A DOUBLE REDUNDANT PROCESSOR, Ser. No. 781,437, filed Mar. 25, 1977, invented by John C. McDonald and James R. Baichtal, and assigned to the same assignee of the present invention.
5. SERVICE GENERATOR CHECKING APPARATUS AND METHOD, Ser. No. 762,808, filed Jan. 26, 1977, now U.S. Pat. No. 4,071,704, issued Jan. 31, 1978 invented by Johannes R. Moed, and assigned to the same assignee of the present invention.
6. PATH TEST APPARATUS AND METHOD, Ser. No. 762,934, filed Jan. 26, 1977, invented by James R. Baichtal, and assigned to the same assignee as the present invention.
7. SERVICE GENERATOR FOR GENERATING A PLURALITY OF TONES, Ser. No. 762,810, filed Jan. 26, 1977, invented by Johannes R. Moed, and assigned to the same assignee of the present invention.

BACKGROUND OF THE INVENTION

The present invention relates to a multifrequency sender receiver in a multi-time slot digital data stream for use with a telephone system operating in time frames each consisting of a plurality of time slots.

Pulse code modulated (PCM) digital signals in a telephone system enable a multiplicity of conversations to be transmitted over a two wire digitally multiplexed line commonly known as a T1 trunk line. The quantized PCM data representative of a sample of a particular portion of a conversation to be sent over a telephone trunk line between a calling and called party is serially interleaved or multiplexed with a number of other conversations into channels within a discrete time period. If 8 binary bits were to represent each quantized value, then up to 256 ($2^8$) discrete values could represent the particular sample. The T1 trunk line comprises 24 multiplexed channels serially presented to a telephone switching system, with each conversation sampled at a frequency of 8 kilohertz (a period of 125 microseconds). Each channel on the T1 line therefore is allocated a time slot of approximately 5.2 microseconds. Several T1 lines grouped together are further multiplexed into what is known as a Line Group. It is possible to switch a conversation on one channel or time slot of one line group to another channel or time slot of the same or another line group through a Time Slot Interchanger.

In addition to PCM coding of voice communications, dial pulsing and multifrequency (MF) pulsing representing calling and called numbers between telephone trunks are known in the art. MF signaling is particularly adaptable to PCM switching techniques because of the speed and accuracy over conventional dial pulse (DP) techniques. MF signals are digitally encoded in PCM format to represent valid number information over telephone trunks by various combinations of 2 of 6 frequencies (700, 900, 1100, 1300, 1500, 1700 Hz) in the voice band.

In order to generate a multifrequency tone, prior art systems have utilized a memory containing in PCM format a representation of one of the tone pairs for a particular digit. Multifrequency tones are particularly adaptable for tone generation because each multifrequency tone can be represented by 21 PCM samples to accurately represent the particular digit. This is because of waveform symmetry for each multifrequency tone pair. All even quarter periods of the waveform are mirror images of the corresponding odd quarter periods. Also, every half quarter period of the waveform is inverted. The tones are read out of the multifrequency tone memory cyclically by a 21 state up/down counter. The outputs of the memory are appropriately complemented and inverted by necessary gating circuitry, depending upon the particular quarter period of the waveform.

However, the requirement of a separate memory for representing each of the digits 0-9 and the other signals, such as KP and ST, necessarily increases the cost of the system over what the cost would be if fewer memories could be utilized.

A telephone system incorporating multifrequency signaling techniques will utilize multifrequency senders to send tone signals in time slots through the system and multifrequency receivers to receive the detect MF tone signals identifying calling and called numbers.

Depending upon traffic conditions, it would be desirable for the telephone system to be capable of allocating the multifrequency senders and receivers to specified time slots in which multifrequency tones are to be sent or received.

In addition, it is desirable to provide a capability of generating the required multifrequency tone utilizing fewer memories than are used in the prior art, thus decreasing the cost of the system.

SUMMARY OF THE INVENTION

The present invention relates to a multifrequency sender/receiver in a telephone system, operating in time frames each consisting of a plurality of time slots.

The sender/receiver comprises sender means for generating and connecting selected tone signals representative of a multifrequency tone pair to a first group of the time slots. Receiver means are provided responsive to the presence of another tone signal representative of a multifrequency tone pair in a second group of the time slots and providing a data signal representative of the tone pair present. Control means are provided for specifying the selected tone signals and for specifying selected ones of the first group of time slots.

In accordance with one feature of the invention, the sender means includes a sample encoder for storing a plurality of pulse code modulated samples representative of each individual tone of the multifrequency tone pairs. Means connected to the sample encoder are provided for reading out sequentially first and second samples from the encoder representative of a first multifrequency tone and a second multifrequency tone. An adder connected to receive the first and second samples is provided for adding the samples thereby forming a composite signal representative of a multifrequency tone pair.

In accordance with another feature of the present invention, the receiver means include a sample memory for storing a plurality of sequential pulse code modulated samples for each of the time slots in the second group of time slots at a storage rate corresponding to the time slot rate, and control means for controlling the writing of the samples into the memory at the storage rate and the reading of the samples out of the memory at a faster rate than the storage rate which thereby multiplies the storage rate by the faster rate. Also included are output buffer means connected to receive the samples for storing the samples at the faster rate, and analog receiver means for detecting multifrequency tones represented by the pulse code modulated samples multiplied by the faster rate.

In accordance with the above summary, the present invention achieves the objective of providing an improved multifrequency sender/receiver for use in a telephone system operating in time frames each consisting of a plurality of time slots.

Additional objects and features of the invention will appear from the description in which the preferred embodiments of the invention have been set forth in detail in conjunction with the drawings.

DESCRIPTION OF THE DRAWINGS

FIG. 1 is a block diagram of an integrated message accounting system in accordance with the present invention.

FIG. 2 is a representation of the time slot frame structure employed within a multiframe format.

FIG. 3 shows the frame bit code utilized by the integrated message accounting system of FIG. 1.

FIG. 5 shows a block diagram of a T1 input portion of the I/O interface of FIG. 1 which is a portion of the FIG. 1 system.

FIG. 6 shows a block diagram of a T1 output portion of the I/O interface of FIG. 1 which forms part of the FIG. 1 system.

FIG. 7 shows a block diagram of a digital switch which forms part of the FIG. 1 system.

FIG. 8 is a timing diagram for the system master clock of FIG. 1.

FIG. 9 shows the byte format utilized by the multifrequency sender of FIG. 10.

FIG. 10 shows a block diagram of a multifrequency sender, which forms a part of FIG. 1.

FIG. 11 shows a representation of a normalized sine wave utilized by the multifrequency sender of FIG. 10.

FIG. 12 shows a block diagram of a multifrequency receiver, which forms a portion of FIG. 1.

FIG. 13 shows the byte format utilized by the multifrequency receiver of FIG. 12.

FIG. 14 shows an exemplary flow chart for describing the operation of the processor which forms a part of the multifrequency sender of FIG. 10.

FIG. 15 shows an exemplary flow chart for describing the operation of the processor which forms a part of the multifrequency receiver of FIG. 12.

FIG. 16 shows an exemplary flow chart for describing the operation of the reframe control circuit which forms a portion of FIG. 5.

DETAILED DESCRIPTION OF THE INVENTION

Figure 4:
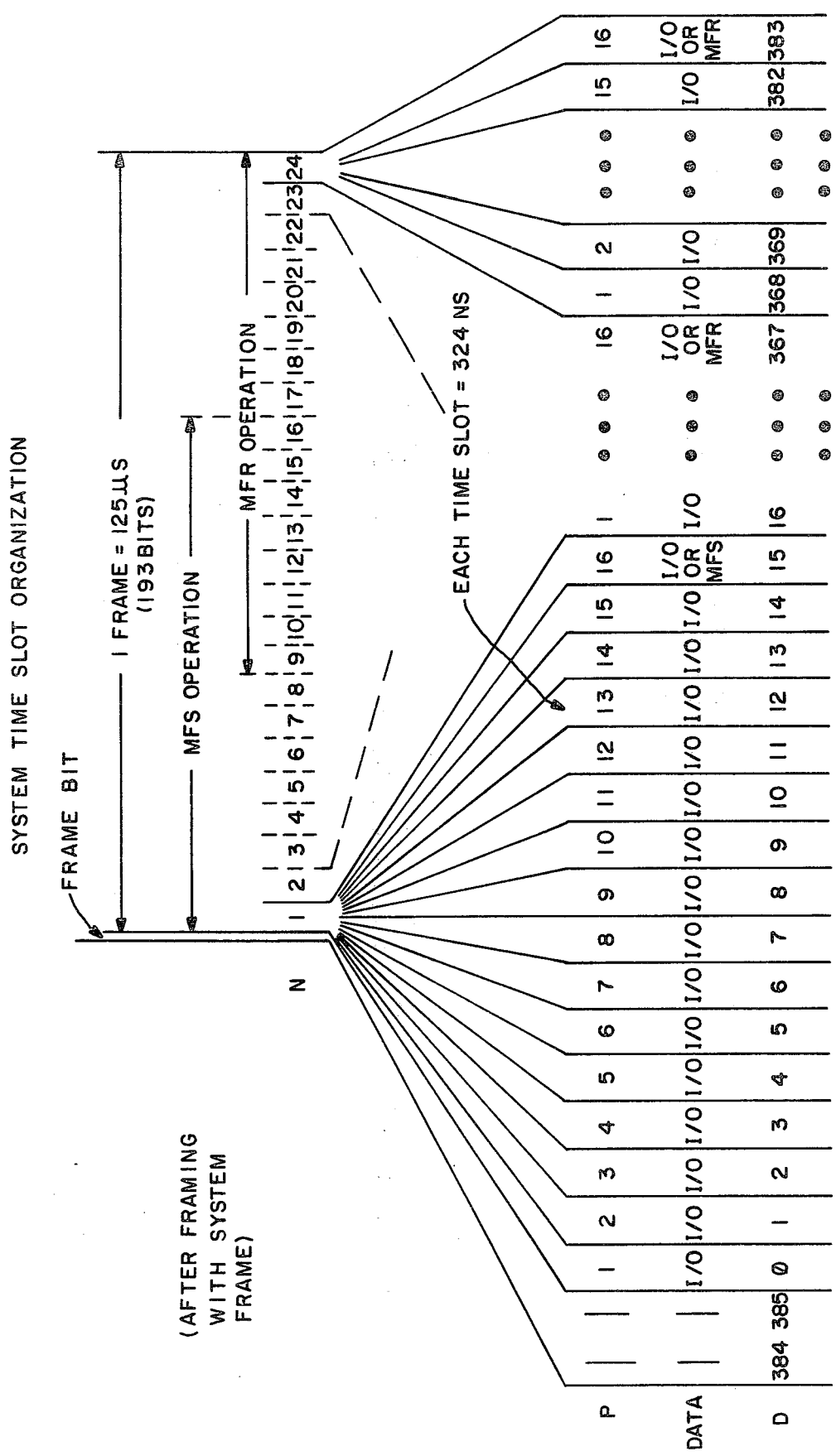
FIG. 4 shows the system time slot organization of the integrated message accounting system.

Referring to FIG. 1, the integrated message accounting system (IMAS) is seen in block diagram form. The IMAS can be used at class 4P toll points to process 1+ toll calls originating in class 5 offices, local calls, and other similar uses. It may be used as a LAMA (Local Automatic Message Accounting) system or as a CAMA (Centralized Automatic Message Accounting) system.

The basic functions of the IMAS are to provide recording of calls on magnetic tape, alternate routing for originating traffic, ONI operation, traffic monitoring reports, tandem routing for completing traffic, and WATS service (wide area telephone service). Further details of the IMAS are described in the above-referenced application entitled "Integrated Message Accounting System".

In FIG. 1, the span terminating equipment (STE) 86 is well-known equipment which functions to transmit, receive, terminate, monitor status of, or loop back the PCM bit streams of T1 lines used as digital trunks in connection with the IMAS.

The VB3 voice bank 87 is well-known equipment which provides time division multiplexing-demultiplexing, PCM encoding-decoding and terminal failure group alarm functions between 24 telephone circuits (VF and signaling) and a 1.544 MB/S bipolar pulse stream in D3 format. As seen in FIG. 1, VB3 87 provides appropriate interfacing with tributary offices, toll network, WATS service, recorded announcements, local first selectors, and Operator Number Identification (ONI) positions. The pulse stream is applied to a T1 input/output interface in the IMAS digital switch. Individual trunks (channel units) are chosen and configured appropriately for each application.

In FIG. 2, the PCM data format in the STE and VB3 equipment is compatible with the American Telephone and Telegraph Company's D3 channel bank, the operation of which is well known. With a sampling frequency of 8,000 Hz for encoding PCM data, one timing frame equals 125 microseconds with 24 time slots per frame per T1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame for a D3 channel bank.

In FIG. 3, the frame bit occurs once at the start of each frame. It contains a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 1, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 1, the unit 20 is either a STE 86 or a VB3 87 unit as previously described. Data from STE/VB3 unit 20 is applied to both the primary and secondary interfaces of a line group 10. For example, data is input to T1 I/O primary interface 11 and the secondary I/O interface 15 via buses 34, 35, and 34, 36, respectively. Data is output from T1 I/O interfaces 11, 15 to STE/VB3 unit 20 via buses 41, 40 and 42, 40, respectively.

As seen in FIG. 1, primary and secondary interface redundancy is employed in all major subsystems in the IMAS to prevent a single point failure which could cause the system to go down. Faulty subsystems are automatically switched off line to provide minimum interruption to service. Further details of the subsystem redundancy are described in the above-referenced application entitled "Integrated Message Accounting System."

A line group 10 interfaces any T1 line pair such as lines 34 and 40 with four Time slot Interchangers (TSI) 21 designated TSI $\phi$-3. A primary T1 I/O Interface also interfaces the optional primary multifrequency sender (MFS) 13 and receiver (MFR) 14 with the TSI 21. A primary T1 I/O interface such as interface 11 accepts bipolar PCM data from a T1 line (34, 40) carrying information in D3 format (standard D3 decode transfer characteristic). A secondary (redundant) T1 I/O Interface such as Interface 15 also interfaces any T1 line pair such as lines 34, 40 with the TSI 21. Interface 15 also interfaces the secondary MFS 17 and MFR 14 with TSI 21.

Incoming data from a unit 20 is stored and synchronized by the I/O Interface such as interface 11 to the IMAS system frame. Data is converted by each I/O interface to 9 bit parallel (includes parity bit) and sent to the time slot interchanger (TSI) 21. Carrier group alarm (CGA) detection (B2=0) and signal bit recovery (Bit 8 of 6th and 12th frames) is also accomplished. Error signals and signal bits are sent to the primary signal processor (SP) 72 or secondary SP 75 for further analysis.

It is possible to operate 16 of these T1 I/O interfaces for each primary and secondary subsystem per line group. Each I/O interface accommodates one T1 line or one VB3 voice bank. Up to four line groups per system may be used. Further discussions of the various primary and secondary subsystems will be limited to the primary subsystem, although it will be understood that the discussion would apply with equal effect to the secondary subsystem.

A line group organizes the voice frequency data from 16 T1 lines or 15 T1 lines and the MFS onto a 384 time slot data bus to the TSI's (TSI$\phi$-TSI3).

Referring to FIG. 4, one frame is equivalent to 125 microseconds or 193 bits. The frames recur at the 8KHz sampling frequency. There are 24 D3 channel numbers as indicated by N, and there are a total of 384 time slots of 324 nanoseconds each, with an additional two time slots for the frame bit. FIG. 4 shows how time slots are organized with respect to the incoming frame. The first 16 time slots are constructed of data from channel one of the 16 incoming frames. The next 16 times are from channel 2 and so on. Each T1 I/O interface is allocated to one of 16 time slots for each D3 channel. 16 T1 lines are each input to the respective T1 line I/O interface and multiplexed to time slots 0-15. P indicates the particular line group interface accessed during a channel number. For example, during channel number one, P1 would indicate primary I/O interface 11 and secondary I/O interface 15 of FIG. 1 is accessed. P15 would indicate primary I/O interface 12 and secondary I/O interface 16 are accessed. P16 would indicate primary multifrequency sender 13 and secondary sender 17 of FIG. 1 are accessed. If the line group did not employ a multifrequency sender and receiver, P16 would indicate accessing another I/O interface. During channel 24, P16 would indicate the primary MF receiver 14 and secondary MF receiver 18 are accessed. The D of FIG. 4 indicates the decimal time slot for the line group from 0-385. D3 channels 1-8 are assigned to the MF sender. D3 channels 17-24 are assigned to the MF receiver and D3 channels 9-16 are assigned to either MFS or MFR, dependent upon traffic conditions.

In FIG. 1, the IMAS digital switch comprises line groups 0-3 and TSI 0-3.

Referring to FIG. 1, the TSI 0-3 switch channel time slot data from any of the four line groups to any other channel time slot of any other of the four line groups. For example, data from line group 0 could be sent via bus 26-1 to TSI 0 and swtiched out bus 28-4 to line group 3. The TSI's receive channel time slot data (8 bits plus parity). When it is available from the line group data bus, the TSI's hold it until the proper time for output in the next frame and transmit the data to the line group data for output. The TSI contains control and data memory for all time slots. The TSI's communicate with both the primary and secondary system controllers (SC) 50, 64 via bus 57, 63. Further details of the digital switch are described in the above-referenced application entitled "Time Slot Interchanger".

In FIG. 1, the primary and secondary service generators (SG) 22, 23 provide capability to connect one of several standard tones in PCM format to any of the channel time slots. These tones include 1,000 Hz, 120 IPM busy, 60 IPM busy, dial tone, ring back tone and internal tones for the IMAS. The primary and secondary SC 22, 23 receive control signals from the respective system controller (SC) 50, 64. Further details of the service generator are described in the above referenced application entitled "Service Generator For Generating A Plurality of Tones".

The primary and secondary signal processors (SP) 72, 75 monitor all the input channels of the IMAS for changes of state and dial digits. Each time a channel is seized or released, or a digit is dialed, a message is sent to the respective SC 50, 64 via buses 74, 77, containing the channel number and the event. All the information needed to determine the changes of state or dial digits is time division multiplexed over several leads originating from the line group.

The SP 72, 75 also have the capability to seize or release channels or dial digits on these channels. Frames 6 and 12 are signaling frames. During these frames, the least significant bit of the 8 bit PCM byte is replaced with a signaling bit. Frame 6 is used for an A signaling bit and frame 12 is used for a B signaling bit. The signal processor uses the A signaling bit for seizure, release and dial digit detection. The B signaling bit is used for state change detection only. Further details of the signal processor are described in the above-referenced application entitled "Register/Sender".

In FIG. 1, the primary and secondary system Master Clock 79, 78 is a conventional device for generating all basic clock signals used by the IMAS. The clock generates 4 clock signals MCLKφ-MCLK3 all of which are 3.088 MHz square waves, but each one is phase shifted by 270 ns nominal. The purpose of this phase shifting is to allow for propagation delay of data as it is routed through the different subsystems contained in the IMAS.

Referring to FIG. 8, the basic frequency of the system master clock is a crystal generated 18.528 MHz. The basic frequency of the system master clock is divided down to the 3.088 MHz square wave.

Master frame pulses FSφ-FS3 generate a 648 ns pulse every 125 us and are used to mark the start of a new frame. FSφ-FS3 are primarily used by subsystems to synchronize their address generators.

The master frame bit signal FBφ-FB3 generate a repeating pattern of serial bits. The pattern repeats every 12 frames and the bits can be decoded to identify each of the 12 frames as seen in FIG. 3.

Again referring to FIG. 1, in addition to the clock signals of FIG. 8 originating from the master clock, an "Active" signal originates from the system controller 50, 64 of FIG. 1 to inform some of the IMAS subsystems that they are on line.

In FIG. 1 the operator number identification subsystems (ONI 80) provides a control interface between the IMAS and ONI operator positions for serving lines not equipped with automatic number identification (ANI) or for calls experiencing ANI failure.

The MF senders (MFS) 13, 17 generate and output MF tone pairs onto the line group data bus 26-1, 44-1 for switching through the time slot interchangers 21 to an outgoing path such as 28-4, 46-4. The MFS 13, 17 communicate directly with system controllers 50, 64 via buses 37, 47, respectively. The MF receivers (MFR) 14, 18 detect MF tones in PCM digital input form and send them to the SC 50, 64 via buses 38, 48, respectively.

The MFS and MFR jointly share one group of 24 D3 time slots and associated control facilities. A minimum of 8 time slots and a maximum of 16 time slots for each sender such as MFS 13 and each receiver such as MFR 14 are available to traffic at any time subject to a total maximum of 24 time slots. Systems with more than one line group may be equipped with the above capacity per line group as required by traffic. Further details of the MF sender and receiver are described subsequently.

The primary and secondary system controllers (SC) 50, 64 are Intel 8080A stored program controllers surrounded by a number of peripheral devices and interfaced to each subsystem. The System Controllers provide the following functions:

(1) call processing including routing, ANI (Automatic Number Identification), ONI, recorded announcement control and creation of billing records.

(2) SC self test (3) system test and maintenance data outputs for accumulation of traffic monitoring data and generation of traffic monitoring reports. The secondary (redundant) SC 64 is updated continuously so that it can assume control of the system with a minimum disruption to service should primary SC 50 experience a failure. Further details of the system controller are described in the above-referenced application entitled A Double Redundant Processor.

The peripheral devices connected to the System Controllers 50, 64 are as follows:

The CRT 51 which is used for:

a. Primary system information display (e.g., traffic, alarms, maintenance program results)

b. Keyboard entry of system control commands and data (e.g., translation table data, trunk-type assignments, test trunk control, and system diagnostic control)

The CRT 51 is the primary system interface to office personnel.

Printer 67: provides printed output records of traffic, alarms, maintenance diagnostics and other system data. In the event of CRT 51 maintenance of failure, the printer may be used as a substitute input-output device.

MTR 52 — The magnetic tape recorder is the primary system billing recording device. The MTR 52 records can be read by a similar industry standard MTR in an EDP data center.

MTC 53 — A magnetic tape cartridge recorder is associated with each SC, primary and secondary. The MTCs are used to load standard programs and office data from tape cartridges. Additionally, the secondary MTC is used as a backup recording device when the MTR is not in service.

RTC 54, 65 — The Real-Time Clock generates the stable time bases for timing all programs in each SC 50, 64.

COI 55, 56, 68, 69 — Control Office Interfaces are used to interface signals in and out of the CO (e.g., Dynamic Overload Control Signals - DOC).

Office Connection Panel 71 — the OCP contains terminal blocks for connection of the system to office alarms, DOC and other office signals are required.

Status and Alarm Panel 70 — the SAP provides basic system status and alarm display and allows limited, direct control of essential functions. It communciates with the SC via COIs.

Test Trunk Panel 88 — the TTP provides jackfields and access to voice and signaling of two 4-wire trunks assigned as system test trunks. Pushbutton switches on the panel allow for talking, dialing and testing on each trunk, for patching together the two test trunks and for momentary monitoring of a call in progress.

ANI Adapter 83 (optional) — provides interface facilities between standard local identifiers and the IMAS SC and VB3 trunks.

An example of a call processing overview of the IMAS will be given to provide a better understanding of the operation of the present invention. The overview will be given in conjunction with FIG. 1 and assumes that the primary portion of the IMAS is on-line. The secondary portion of the IMAS is off-line but would automatically be switched on-line should the primary portion experience a failure. Therefore, the description of the call processing overview as it applies to the primary portion of the IMAS will apply with equal effect to the secondary portion.

Call Overview

Referring to FIG. 1, a subscriber in a tributary office 90 goes off hook, receives a dial tone from the local office and dials "1" to initiate a 1+ direct distance dialing (DDD) call. This causes a 1+ toll connecting trunk 92 to the IMAS to be seized (go off hook) at the tributary office 90. The seizure is passed into the IMAS through STE/VB3 unit 20 as a change of state of a signaling bit on a T1 line such as 34, 40 entering a T1 I/O interface such as interface 11. The seizure is recognized by the signal processor 72 which passes the change in trunk state to the system controller (SC) 50.

The Controller 50 begins a process of building up a Call Processing Record. As the subscriber dials a called number, the signal processor (SP) 72 detects each dialed digit and forwards it to the SC 50 for storage in memory.

At the appropriate time, the Controller 50 signals the tributary office 90 via the SP 72 to initiate calling number identification. The tributary identifier in the tributary office 90 is activated, the SC 50 connects an MF receiver (by assigning the MFR 14 to a time slot corresponding to the time slot occupied by the 1+ originating trunk 92) and the Calling number information is passed to the MFR 14. The MFR 14 forwards each digit received to the SC 50 where this information is assembled in memory with called number and other information necessary to form a complete record for eventual use as a billing record.

With called number information in the memory of the SC 50, the controller 50 proceeds to perform a translation (3 digits or 6 digits as required). An outgoing trunk group connected to Toll Network 91 is chosen and an idle outgoing trunk such as trunk 93 is selected. The digital switch (consisting of line group 10 and time slot interchanger 21 paths) is set up and path tested for path continuity. The MF sender 13 is commanded by the SC 50 to out pulse an MF tone. Alternatively, dial pulse sending (DP) is also possible using the SP 72.

The SP 72 monitors the state of the outgoing trunk 93 after outpulsing and initiates call timing in the SC 50 at answer supervision by using the real time clock 54 associated with the SC 50. The SP 72 continues to monitor the state of the outgoing trunk signaling until the call is terminated. At this point, the SP 72 informs the SC 50 that the subscriber associated with the tributary office 90 went back on hook. The SC 50 then assembles a billing record in its output memory buffer area. When a block of 16 billing records is present in the buffer area, it is written on the output magnetic tape recorder (MTR) 52.

The information contained in a call record is: the date; connecting time; elapsed time in minutes and seconds; originating number; terminating number; type code; class code; information code; time and charge code; trouble code; CPFR code; incoming trunk ID; outgoing trunk ID; and toll center number.

Referring to FIG. 5, the input portion of the T1 I/O interface 11 of FIG. 1 accepts serial bipolar PCM data from a T1 line 35 carrying information in D3 format. Each time slot of incoming data comprises 8 bits of PCM sampled data so that there are 192 bits for 24 channels per T1 line plus one framing bit. Incoming data is stored and synchronized to the IMAS system frame. Serial data is converted to 9 bit parallel (8 bits data plus parity bit) and sent to the time slot interchanger (TSI). Carrier group alarm (CGA) detection (Bit 2=0) and signal bit recovery (Bit 8 of 6th and 12th frames) is also accomplished. Error signals and signal bits are sent to the signal processor for further analysis.

It is possible to operate 16 of these interfaces per line group. Each interface accommodates one T1 line or VB3 voice bank. Up to 4 line groups per system may be used.

Incoming PCM data on Bus 35 from the unit 20 is converted to normal TTL levels by a conventional Unipolar Converter 102 and gated through the conventional Data Select 131 on Bus 103 by an Active signal applied to the line group in response to the Master Clock 78 under control of the system controller 50 of FIG. 1.

The Master Clock 78 provides the necessary timing signals to the Input Timing Generator (ITG) 129 via bus 60. The ITG 129 includes conventional counters and logic to distribute common miscellaneous timing functions to the various subsystems of the I/O Input Interface of FIG. 5. The conventional Clock Recovery circuit 110 receives the PCM data and reconstitutes a clock signal to provide a clocking edge that lags the data bit by one quarter period of the square wave period. Data is loaded from Data Select 104 into a holding buffer in the Elastic Store 106, a 256 bit store, via bus 105 until the next available write window from the Read/Write Control (RWC) 120. The Read/Write Control 120, a typical selector circuit to insure there is no interference between read and write times, then gates the Write Address Counter 118 through a conventional Address Select Circuit 129 to the Elastic Store 106 and writes the data bit at this address location on a 256 × 1 bit RAM. The Write Address Counter 118 is 8 bits wide (to address 192 bits of data per T1 line) and free running at 1.544 MHz. Since the system clock has a basic frequency of 3.088 MHz, it will have 2 rising edges per incoming data bit; thus there are two available write windows per incoming bit to assure that each bit will be written in the Elastic Store 106 regardless of the phase or jitter of the recovered incoming clock with respect to the master clock timing of the ITG 129.

When the line group is not active, data from the output interface of FIG. 6 is looped around through Data Select 104 of FIG. 5 via Bus 199. This allows off line checking of a line group to be sure that it is ready for service, the details of which are more fully described in the above-identified application entitled "Service Generator Checking Apparatus And Method."

The Reframe Control Circuit 144 controls the state of the Read Address Counter 154, and clocks the appropriate data bit from the Elastic Store 106 into the Serial To Parallel Converter 136 via Bus 132. Converter 136 is a conventional shift register. When the 8 bit word (D3 format) of a T1 channel is present in the Serial To Parallel Converter 136, it is clocked into the Output Buffer 140 via 8-Bit Bus 138 by the ITG 129 along with a parity bit from Parity Generator 134 computed at the input to the Serial To Parallel Converter 136. ITG 129 then sequentially connects this output buffer 140 in its turn with 15 other input interface circuits of the FIG. 5 type to the TSI bus 26-1 through Line Driver 143 and bus 24-1 to the TSI of FIG. 7. TSI bus 26-1 is a conventional three-state bus that is accessed by the other fifteen T1 input interfaces in their turn to form 384 (16 × 24 D3 channels) time slots. The 16 input interface circuits each with their 24 T1 channels (D3 format) form the 384 (16 × 24) channels per line group.

Once per frame, the Reframe Control 144 compares the frame bit at the appropriate position in the Serial To Parallel Converter 136 with its own frame code generator. If two or more errors in four frames occur, a reframe mode is initiated. Reframing is accomplished by adjusting the delay through the Elastic Store 106. A frame error signal appears on bus 147 for transmission to SP 72 of FIG. 1 via bus 73-1.

The Reframe Control 144 includes a comparator, four frame counter and processor, which includes a PROM and data selector. A group of data bits in the vicinity of the system frame bit time is inspected for potential frame bits. Each bit position is checked until it either produces the correct framing sequence for ten frames or one error in a potential sequence is detected. When the entire group has been checked and no frame code sequence has been found, the Read Address Counter 154 is advanced to select the next group of bits. This process continues until the above mentioned framing sequence is found. The "found" bit position is synchronized with the system frame bit position by delaying the Read Address Counter 154 and a framed condition is reestablished.

An exemplary flow chart for describing the operation of the processor contained within the reframe control is shown in FIG. 14. The processor of reframe control 144 will execute the following steps for finding the framing bit for the line group.

In FIGS. 3 and 4, the frame bit position shown occurs once at the start of each frame. It contains a framing code that takes 12 frames to repeat.

Referring to FIG. 14, steps 0, 1, 2, 3 and 5 are executed in a sequence when the reframe control 144 is in a framed condition. The read address counter 154 and converter 136 of FIG. 5 are continuously being clocked once per incoming bit. Thus the read address counter 154 keeps pace with the write address counter 118.

The processor will wait at step 0 until IFC (input frame control) decision sends it to step 1. IFC is a typical signal from the ITG 129 of FIG. 5, which occurs one D3 time slot after the frame bit. If IFC is no, the processor returns to step 0. If IFC is yes, the processor proceeds to step 1.

At step 1, the frame code generator/comparator (internal to the reframe control 144) is clocked to keep its internal frame bit up to date. In addition, the Address Counter 154 and Converter 136 of FIG. 5 are incremented as in step 0.

At this point the incoming frame bit FB is compared with the internal frame bit. Assuming the four frame counter is at frame 0, if no code error is detected (CE=OF) the processor will continue to step 2 and clock the address counter 154 and converter 136 of FIG. 5.

From step 2, the processor goes to step 3 if the four frame counter is at frame zero in its count where the four frame counter is kept reset and a reframe flag is lowered. Lowering the reframe flag will apply the appropriate flag state to the most significant bit of the four frame counter when being loaded.

The processor returns then to step 0 and repeats the cycle.

In step 1, if the frame code generator does detect a code error, at frame zero or no code error at frames 1, 2, or 3 (CE=OF is a yes condition), the processor branches to step 5 where the four frame counter is incremented to the next state. The cycle repeats until the four frame counter returns to 0 or another code error occurs. A second error in four frames causes the reframe mode to be entered at step 12 via step 2.

At step 12, the reframe flag is raised when the four frame counter is reset. Raising the reframe flag applies the appropriate reframe flag stage to the most significant bit (MSB) of the four frame counter when being loaded. Also, the read address counter 154 of FIG. 5 is advanced 8 counts with respect to the write address. For 3 consecutive frames, the 8 bits in this frame position are loaded into converter 136. This is accomplished in steps 13, 14 and 9 and is controlled by decision IRL (input reframe load) and the four frame counter of reframe control 144. IRL is another timing signal from ITG 129 of FIG. 5.

When the four frame counter returns to frame 0, the processor branches from the load loop to state 15. At this point the 4th set of 8 bits together with the three previous sets of 8 bits form 8 4-bit words that are clocked into the frame code generator and inspected one at a time for any of the twelve codes shown in FIG. 3. If one is found, the code compare (CC) indicates that a potential frame code sequence has been found and the processor goes to step 6. If no valid code is found the processor branches to step 6 after the 8th word has been inspected.

Referring to FIG. 14, at step 6, the processor checks CC to see if it has terminated the search mode. If not the processor jumps back to step 12 to repeat the process for the next 8 bits in the frame. If CC is a yes, then the sync mode is entered at step 7.

In steps 7 and 8, the four frame counter is set to zero to prepare for the check mode, and the position of the found code is synchronized to the system frame bit position by decision IAS (input address sync), a timing signal from ITG 129 of FIG. 5.

Steps 10, 11 and 4 are the check mode in which the processor inspects the FB position in the normal manner for 3 more frames, after rechecking the found bit. Decision CE (code error) indicates that the incoming frame bit is not equal to the frame code generator bit. If CE is yes, it will cause the processor to jump back to step 12 to repeat the process. Otherwise the four frame counter returns to 0 and the processor branches to step 5. Three more FB positions are checked for errors with a single error causing a return to step 12 via step 2.

After 10 consecutive FB positions containing no errors have occurred, the processor restores a framed condition at step 3.

In FIG. 5, signal bits are written into the Signal Bit Store 150, a 32 × 4 bit RAM, during frames 6 and 12, as determined by the internal frame code generator of the Reframe Control 144 from the appropriate output of the Serial To Parallel Converter 136. Since the Reframe Control 144 synchronizes the incoming frame bit to the nearest system frame bit position, the incoming frame number bears no relation to the current system frame number. Therefore, signal bits from the Signal Bit Store 150 are allowed to stay on line for 12 consecutive frames to be sure they are valid during the system signaling frames.

During normal operation, the second bit position (next to the most significant bit) in all 24 words is inspected by conventional Detector 148. If all 24 bits are zero, then a B2=0 signal appears on bus 149 which is sent to SP 72 of FIG. 1 via Bus 73-1.

The B2=0 means that all 24 bit 2 positions in one frame (D3 format) are 0. This is a carrier group alarm (CGA) sent by the associated D3 equipment. The framing error has priority over the B2=0 error.

Signal bits, B2=0 error signals, and framing errors are applied to the SP bus 73-1 and sent to the SP in the same manner as data sent to the TSI. These signals are processed and relayed to the System Controller to give trunk status information.

Path tests are performed to insure that the particular path is or is not set up through the TSI. The Path Test Generator (PTG 156) receives a command from the SP via bus 73-2 to invert the parity bit of the channel under test. The parity is inverted at line driver 143. Parity checking of all output interfaces discloses the results of the path test. Further details of the path test are described in the above-identified application entitled "Path Test Apparatus and Method."

Referring to FIG. 6, the output interface accepts data from the TSI and Signal Processor (SP) in parallel form. It is converted to a serial format and then to bipolar PCM to be applied to the T1 line. During signaling frames, signal bits from SP are inserted at the appropriate place in the parallel word. The signaling frames in the IMAS are frames 6 and 12 with the 8th bit of each channel time slot allocated for a signal bit to indicate on-hook or off-hook status. Also, a zero suppression circuit maintains at least a 1 out of 16 pulse density on the T1 line. The zero suppress circuit monitors all 8 bits being applied to the parallel to serial converter. If all 8 bits are 0, Bit 7 is forced to a one. This insures that no more than 15 consecutive zeros will appear in a T1 stream, a condition necessary to keep clock recovery circuits alive. A parity check is made of all data. Parity errors are sent to the signal processor for analysis.

It is possible to operate 16 of these interfaces per line group. Each interface accommodates 1 T1 line or VB3 voice bank. Up to four line groups per system may be used.

Referring to FIG. 6, the output portion of the I/O Interface 11 of FIG. 1 is shown in more detail. Data from the TSI is applied to the conventional Input Buffer 167 via Line Receiver 165 and buses 28-1, 30-1.

The Output Timing Generator (OTG) 196 loads Input Buffer 167 whenever an outgoing PCM word apppears on the bus 30-1. The OTG 196 is similar to the ITG 129 of FIG. 5. When 16 words have been loaded (1 word in each buffer for up to 16 interfaces), the conventional Parallel To Serial Converter 171 in all of the interfaces is loaded with this data. The serial data immediately starts shifting out on the T1 line 41 via the Bipolar Converter 179 and the T1 Line Driver 181. The Active signal from Master Clock 78 of FIG. 1 controls a pair of relays that connect the T1 Line Driver to T1 line. The primary and secondary interfaces are connected in parallel at the T1 line. Therefore the off-line driver is disconnected by the relays.

During system frames 6 and 12, signal bits are inserted at Bit 8 via the Signal Select 175, which is similar to data select 104 of FIG. 5. In FIG. 6, signal bits are received from the signal processor via bus 73-3, 192 and line Receiver 191, and are loaded with parity in the same manner as data from the TSI. Bus 73-3 corresponds to Bus 73 of FIG. 1.

In FIG. 6, the Zero Suppress circuit 174 is a comparator circuit that monitors all 8 bits being applied to the Parallel To Serial converter 171. If bits 1–6 and 8 are 0, Bit 7 is forced to a 1. This insures that no more than 15 consecutive zeros will appear in a T1 stream, a condition necessary to keep clock recovery circuits alive.

The conventional Parity Checker 184 is preset to its start state at the beginning of each serial word. The preset state is determined by monitoring data parity, signal parity if frames 6 or 12, and the Zero Suppress circuit 174. The Parity Checker 184 computes parity on the serial word as it is applied to the input of the T1 Line Driver 181. The proper parity error condition exists at the end of the serial word and is loaded into the Parity Muxer 186 along with the 15 other parity error conditions. The Parity Muxer 186 sends the 384 channels of parity error data per frame to the Signal Processor 72 of FIG. 1 via Line Driver 188 and buses 187, 73-2. Bus 73-2 corresponds to Bus 73 of FIG. 1.

In FIG. 6, the frame bit is always applied to the serial input of the Converter 171. The OTG 196 only allows the frame bit to shift through to the output at the appropriate frame bit time.

When a line group is off line, the Active signal will select data from the Bipolar Converter 179 instead of data from the Unipolar Converter of the T1 input interface of FIG. 5. This allows a loop around test to be performed by the Service Generator (SG) 22 of FIG. 1. The T1 input interface frames up on the serial T1 stream from the output section allowing TSI output bus data to be looped around to the TSI input bus. Further details of the loop around test are described in the above-identified application entitled "Service Generator Checking Apparatus and Method".

Referring to FIG. 7, the timed division multiplexed PCM digital switch network configuration used in the IMAS is shown. The digital switch comprises line groups 0–3 and TSI 0–3 of FIG. 1. Network paths have been derived by multiplexing together sixteen 24-channel T1 lines in a line group to form 16 × 24 or 384 time division channels or time slots. In a full size IMAS there are 4 line groups 10 for a total of 1536 terminations or channels. Each line group has primary and secondary redundancy as previously described, but not shown here. The channels appear sequentially on the horizontal input paths 26-1 to 26-4 of the network and are switched to the desired outgoing paths 28-1 to 28-4 by the time slot interchanger TSI $\phi$-3, associated with the vertical paths 208-1 to 214-4 of the network.

As an example, assure a call is in progress from LG0 to LG1 through TSI O. In operation, under control of the System Controller 50, an originating channel sample from one of the T1 lines is multiplexed out on a horizontal path such as path 26-1 as one of 384 time slots for the group. The data is switched to a vertical path such as 210-1 to TSI O. The TSI O transfers the sample to its memory, where it is held until the terminating channel time slot in the next frame appears, whereupon the sample is transferred back on path 208-1 and switched to a path such as 28-2 to the line group LG1 and the T1 line on the terminating channel. Further details of the TSI are described in the above-identified application entitled "Time Slot Interchanger."

The operation of the MF sender will be described in conjunction with the description given previously in the call processing overview. In the overview, a calling party has dialed the called party and the SC has chosen an outgoing trunk group and an idle outgoing trunk is selected. The digital switch consisting of the line group and TSI paths is set up and path tested between the selected MFS channel and the selected outgoing trunk and the MF sender is commanded by the SC to outpulse onto the TSI Bus.

The 24 channel times of a D3 frame are used by the MFS as follows: the first 16 channel times are reserved for outputting tone bursts on MFS channel numbers 1 through 16, respectively. The last 8 are reserved for processing commands from the SC. Depending upon traffic conditions, the SC can assign D3 channel numbers 9–16 to any combination of the MF Sender and MF receiver.

Referring to FIGS. 9 and 10, the Universal Asynchronous Receiver/Transmitter 302 accepts commands from the SC in the form of a MFS channel number (Byte 0) followed by the tone pair representative of a particular digit to be sent on the channel (Byte 1). FIG. 9 shows the MFS byte format as sent from SC. Byte 0 is an 8 bit word with MF channels 0–15 identified by bits 1–4. Bits 5 and 6 are not needed and therefore are all zeros. Bit 7 is a zero to indicate Byte 0. Bit 8 is a parity bit for odd parity.

In FIG. 10, the MF Sender 13 of FIG. 1 is shown in more detail.

Byte 1 in FIG. 9 is an 8 bit word sent by the SC to indicate which tone pair of the frequencies 700, 900, 1100, 1300, 1500 and 1700, are to be output by the MFS. Bits 1–3 of byte 1 indicate the frequency FA to be sent and bits 4–6 indicate frequency FB to be sent. Bit 7 is a one to indicate Byte 1. Bit 8 is again a parity bit for odd parity. The characters to be sent will be identified by the FB + FA column. The characters to be sent in FIG. 9 are as follows: the digits 1–0 are self-explanatory. The ST3P, STP, and ST2P characters are for traffic service position system. The KP character is prepartory signal for digits 1–0. The ST signal is an end of pulsing sequence.

Referring to FIG. 10, Universal Asynchronous Receiver/Transmitter (UART) 302 applied data from SC to the Processor 304, Digit Memory 307 and Channel Buffer 306 via 8-Bit Bus 306. The processor 304 include a 5 bit counter addressing 32 processor states, 2 Proms containing program instructions, a 1 of 16 data selector, and a 3 to 8 line decoder. Processor 304 is constructed of standard MSI chips. The operation of the processor will be described subsequently in conjunction with FIG. 14, which is an exemplary flow chart depicting the operating of the processor 304.

Digit memory 307 is a 16 × 6 bit memory. Channel buffer 306 is a 4 bit memory because there are 16 possible MFS channels.

The Processor 304 loads the Channel Buffer (CB) 306 via Bus 317 with the channel number. The Processor 304 updates data in each of the 16 sender channels, services data from the SC and returns a GO or NO GO message to the SC via Bus 318, UART 302, and Bus 37 for each tone pair requested, as seen in FIG. 9. The output of the CB 306 is used to address the Digit Memory 307 and the Timer Memory 308 via the conventional Address Select 305 circuit and Bus 319.

The Input Timing Generator ITG 315 receives timing signals from the Master Clock and applies the appropriate signals to the various subsystems in the MF sender via Bus 320 in a fashion similar to that described for the Input Timing Generator 129 in the T1 input interface of FIG. 5.

The Digit Memory 307, a 16 × 6 bit memory, is loaded with the tone pair to be sent out on TSI bus 26-1. During this time error checks (not shown) are made on the UART 302, Channel Buffer 306, Digit Memory 307, the received byte order, and availability of requested channel number. Any failures result in a NO-GO condition being sent to the SC and no further processing takes place.

If no error occurs, the Timer Memory 308 is preset to its start condition and incremented through one cycle to check for errors. A GO condition is sent to the System Controller via Bus 37.

Once present, the Timer Memory 308 cycles until it times out. The time out bus 321 is used to disable the nine bit Data Buffer 313. Timer Memory 308 includes a 16 × 4 bit memory and adder incremented on each 8 ms to form a per channel timer for each of the 16 MF Sender Channels. Thus MFS data is allowed on the TSI Bus 26-1 via bus 27 and conventional line driver 331 only during a timing interval for any channel. However, MFS data representing the last tone pair stored in the digit memory for each MFS channel is continuously clocked into the Data Buffer 313. The Data Buffer 313 is also disabled by an appropriate signal during the last 8 channel times via Bus 320 from ITG 315.

The MF tones (700, 900, 1100, 1300, 1500 and 1700 Hz.) have an odd number of quarter cycles in 2.5 milliseconds or 20 sample periods of a T1 line. For example, a 700 Hz. signal will have 7 quarter cycles per 2.5 ms., 900 Hz. will have 9 quarter cycles per 2.5 ms. and so on. In FIG. 11, a normalized sine wave is shown. At T0 its magnitude is +1. 2.5 milliseconds later it is exactly 0. Any of the MF frequencies with a starting value of +1 or −1 (normalized sine value) will have a value of exactly zero 2.5 ms. later. At this point the magnitudes repeat and the signs reverse. In FIG. 11, sample number 19 is −V, and sample number 20 is 0. Sample number 21 is the same magnitude as sample 19 but with a reversed sign (+V). Thus a 21 state up/down counter can address samples for all 6 frequencies with a sign change by conventional gating circuitry (not shown) every 5 ms. at the zero crossing point. All frequencies return to the starting values after 10 ms.

Referring to FIG. 10, the Sample Encoder 309 generates 6 bit samples (5 bit magnitude and sign) for each of the 6 frequencies. The Encoder 309 contains a 256 × 8 ROM to generate the samples. In TABLE I, a normalized sine wave is assigned 31 positive values, 31 negative values and a 0 value. The normalized 700 Hz sine wave in FIG. 11 has a value for sample number 1 of 0.853. The nearest value as set forth in Table I is 0.839, which is represented digitally by 011010. Therefore, 011010 would be encoded in the sample encoder for sample number one for a 700 Hz. signal. Similarly, the remaining sample numbers for each of the MF signals would be encoded in the sample encoder 309 in like fashion.

TABLE I

| | Norm Sine Value | Twos Complement Code | | Norm Sine Value | Twos Complement Code |
|---|---|---|---|---|---|
| 31 | 1.000 | 011111 | −1 | −.032 | 111111 |
| 30 | .968 | 011110 | −2 | −.065 | 111110 |
| 29 | .935 | 011101 | −3 | −.097 | 111101 |
| 28 | .903 | 011100 | −4 | −.129 | 111100 |
| 27 | .871 | 011011 | −5 | −.161 | 111011 |
| 26 | .839 | 011010 | −6 | −.194 | 111010 |
| 25 | .806 | 011001 | −7 | −.226 | 111001 |
| 24 | .774 | 011000 | −8 | −.258 | 111000 |
| 23 | .742 | 010111 | −9 | −.290 | 110111 |
| 22 | .710 | 010110 | −10 | −.323 | 110110 |
| 21 | .677 | 010101 | −11 | −.355 | 110101 |
| 20 | .645 | 010100 | −12 | −.387 | 110100 |
| 19 | .613 | 010011 | −13 | −.419 | 110011 |
| 18 | .581 | 010010 | −14 | −.452 | 110010 |
| 17 | .548 | 010001 | −15 | −.484 | 110001 |
| 16 | .516 | 010000 | −16 | −.516 | 110000 |
| 15 | .454 | 001111 | −17 | −.548 | 101111 |
| 14 | .452 | 001110 | −18 | −.581 | 101110 |
| 13 | .419 | 001101 | −19 | −.613 | 101101 |
| 12 | .387 | 001100 | −20 | −.645 | 101100 |
| 11 | .355 | 001011 | −21 | −.677 | 101011 |
| 10 | .323 | 001010 | −22 | −.710 | 101010 |
| 9 | .290 | 001001 | −23 | −.742 | 101001 |
| 8 | .258 | 001000 | −24 | −.774 | 101000 |
| 7 | .226 | 000111 | −25 | −.806 | 100111 |
| 6 | .194 | 000110 | −26 | −.839 | 100110 |
| 5 | .161 | 000101 | −27 | −.871 | 100101 |
| 4 | .129 | 000100 | −28 | −.903 | 100100 |
| 3 | .097 | 000011 | −29 | −.935 | 100011 |
| 2 | .065 | 000010 | −30 | −.968 | 100010 |
| 1 | .032 | 000001 | −31 | −1.000 | 100001 |
| 0 | .000 | 000000 | | | |

The sample is selected from the ROM by the 3-bit frequency select line 323 from the digit memory 307 and the up/down counter 310 that generates the sample number of the particular frequency on the 5-Bit Bus 324. Thus, the three bits on line 323 are the higher order bits and the five bits on bus 324 are the lower order bits to address the sample encoder 309.

During the output cycle, sender numbers are selected by the Input Timing Generator 315 via the Address Select 305 circuit and 4 bit bus 319. The two tones in the Digit Memory 307 at this address are read out serially and applied to the Sample Encoder 309 via bus 323. Two samples, one for each of the tones are read out of the Sample Encoder 309 and loaded into the binary Adder 311 via Bus 325 (FA) and 326 (FB) along with a sign bit from Counter 310 via Bus 327 to form a 7-Bit composite signal code. It can be seen from Table I that the composite 7 bit code can have 62 positive values, 62 negative values and 1 zero value for a total of 125 different values for the composite sample.

The 7-Bit composite sample code is applied from Adder 311 via Bus 328 to address the PCM Encoder 312 to select the equivalent PCM code for the composite sample. The PCM Encoder 312 is a 1K ROM and forms the proper PCM word for the particular composite binary magnitude to be compatible with the standard D3 decode transfer characteristic. This is necessary because quantizing a message signal by certain discrete levels or steps inherently introduces an initial error into the amplitude of the samples, giving rise to quantization noise. The Bell U-255 companding law reduces the quantization noise by dividing the magnitude range into 8 segments in which 16 levels are equally spaced within each of the segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

The normalized peak value for a +3dBm sine wave is 8031 in PCM code. Therefore, a −6dbm sine wave (MF tones) will have a normalized peak value of 2938.4 in PCM code and 2 peaks added together will have the value of 5678.8. Therefore, all values in the PCM encoder will be scaled to a normalized value of 5678.8. As previously mentioned, there are 125 possible composite samples for Adder 311. A resulting sample code will be used to address PCM Encder to select the equivalent PCM code for the composite sample compatible with the D3 companding law. The equivalent PCM code is set forth in Table II.

The Add column indicates the even address stored in Encoder 312. The Norm D3 Mag column indicates the normalized D3 value and the value used. The Error column indicates the percentage error of the used value.

TABLE II

| | Positive Samples | | | | | | | Negative Samples | | | |
|---|---|---|---|---|---|---|---|---|---|---|---|
| ADD | ODD 4321 | EVEN 4321 | NORM. 03 MAG. VALUE | USE | ERROR % | | | | | | |
| 0 | 0111 | 1111 | .0 | 0 | .00 | 132 | 1000 | 1001 | 5678.8 | 5727 | .85 |
| 2 | 0110 | 0000 | 91.6 | 93 | .02 | 134 | 0000 | 1010 | 5587.2 | 5471 | −2.05 |
| 4 | 1101 | 0100 | 183.2 | 187 | .07 | 136 | 1000 | 1010 | 5495.6 | 5471 | −.43 |
| 6 | 0100 | 1100 | 274.8 | 279 | .07 | 138 | 0000 | 1010 | 5404.0 | 5471 | 1.18 |
| 8 | 0100 | 0111 | 366.4 | 359 | −.13 | 140 | 1000 | 1011 | 5312.4 | 5215 | −1.72 |
| 10 | 1100 | 0001 | 458.0 | 455 | −.05 | 142 | 0000 | 1011 | 5220.8 | 5215 | −.10 |
| 12 | 0011 | 1101 | 549.6 | 559 | .17 | 144 | 0000 | 1011 | 5129.2 | 5215 | 1.51 |
| 14 | 0011 | 1010 | 641.2 | 655 | .24 | 146 | 0000 | 1100 | 5037.6 | 4959 | −1.38 |
| 16 | 1011 | 1000 | 732.7 | 719 | −.24 | 148 | 0000 | 1100 | 4946.1 | 4959 | .23 |
| 18 | 1011 | 0101 | 824.3 | 815 | −.16 | 150 | 1000 | 1100 | 4854.5 | 4959 | 1.84 |
| 20 | 0011 | 0010 | 915.9 | 911 | −.09 | 152 | 1000 | 1101 | 4762.9 | 4703 | −1.05 |
| 22 | 1010 | 1111 | 1007.5 | 1023 | .27 | 154 | 0000 | 1101 | 4671.3 | 4703 | .56 |
| 24 | 1010 | 1110 | 1099.1 | 1087 | −.21 | 156 | 0000 | 1101 | 4579.7 | 4703 | 2.17 |
| 26 | 1010 | 1100 | 1190.7 | 1215 | .43 | 158 | 1000 | 1110 | 4438.1 | 4447 | −.72 |
| 28 | 0010 | 1011 | 1282.3 | 1279 | −.06 | 160 | 0000 | 1110 | 4396.5 | 4447 | .89 |
| 30 | 0010 | 1010 | 1373.9 | 1343 | −.54 | 162 | 0000 | 1111 | 4304.9 | 4191 | −2.01 |
| 32 | 0010 | 1000 | 1465.5 | 1471 | .10 | 164 | 0000 | 1111 | 4213.3 | 4191 | −.39 |
| 34 | 1010 | 0111 | 1557.1 | 1535 | −.39 | 166 | 1000 | 1111 | 4121.7 | 4191 | 1.22 |
| 36 | 0010 | 0101 | 1648.7 | 1663 | .25 | 168 | 1001 | 0000 | 4030.1 | 3999 | −.55 |
| 38 | 0010 | 0100 | 1740.3 | 1727 | −.23 | 170 | 0001 | 0000 | 3938.5 | 3999 | 1.06 |
| 40 | 1010 | 0010 | 1831.9 | 1855 | .41 | 172 | 1001 | 0001 | 3846.9 | 3871 | .42 |
| 42 | 0010 | 0001 | 1923.5 | 1919 | −.08 | 174 | 0001 | 0010 | 3755.3 | 3743 | −.22 |
| 44 | 1010 | 0000 | 2015.1 | 1983 | −.56 | 176 | 1001 | 0011 | 3663.7 | 3615 | −.86 |
| 46 | 0001 | 1111 | 2106.7 | 2079 | −.49 | 178 | 0001 | 0011 | 3572.1 | 3615 | .75 |
| 48 | 1001 | 1110 | 2198.2 | 2207 | .15 | 180 | 1001 | 0100 | 3480.6 | 3487 | .11 |
| 50 | 0001 | 1101 | 2289.8 | 2335 | .80 | 182 | 1001 | 0101 | 3389.0 | 3359 | −.53 |
| 52 | 0001 | 1101 | 2381.4 | 2335 | −.82 | 184 | 0001 | 0101 | 3297.4 | 3359 | 1.09 |
| 54 | 0001 | 1100 | 2473.0 | 2463 | −.18 | 186 | 0001 | 0110 | 3205.8 | 3231 | .44 |
| 56 | 0001 | 1011 | 2564.6 | 2591 | .46 | 188 | 0001 | 0111 | 3114.2 | 3103 | −.20 |
| 58 | 0001 | 1010 | 2656.2 | 2719 | 1.11 | 190 | 1001 | 1000 | 3022.6 | 2975 | −.84 |
| 60 | 0001 | 1010 | 2747.8 | 2719 | −.51 | 192 | 1001 | 1000 | 2931.0 | 2975 | .77 |
| 62 | 1001 | 1001 | 2839.4 | 2847 | .13 | 194 | 1001 | 1001 | 2839.4 | 2847 | .13 |
| 64 | 0001 | 1000 | 2931.0 | 2975 | .77 | 196 | 1001 | 1010 | 2747.8 | 2719 | −.51 |
| 66 | 1001 | 1000 | 3022.6 | 2975 | −.84 | 198 | 0001 | 1010 | 2656.2 | 2719 | 1.11 |
| 68 | 1001 | 0111 | 3114.2 | 3103 | −.20 | 200 | 0001 | 1011 | 2564.6 | 2591 | .46 |
| 70 | 1001 | 0110 | 3205.8 | 3231 | .44 | 202 | 0001 | 1100 | 2473.0 | 2463 | −.18 |
| 72 | 0001 | 0101 | 3297.4 | 3359 | 1.09 | 204 | 0001 | 1101 | 2381.4 | 2335 | −.82 |
| 74 | 1001 | 0101 | 3389.0 | 3359 | −.53 | 206 | 0001 | 1101 | 2289.8 | 2335 | .80 |
| 76 | 0001 | 0100 | 3480.6 | 3487 | .11 | 208 | 0001 | 1110 | 2198.2 | 2207 | .15 |
| 78 | 0001 | 0011 | 3572.1 | 3615 | .75 | 210 | 0001 | 1111 | 2106.7 | 2079 | −.49 |
| 80 | 0001 | 0011 | 3663.7 | 3615 | −.86 | 212 | 0010 | 0000 | 2015.1 | 1983 | −.56 |
| 82 | 0001 | 0010 | 3755.3 | 3743 | −.22 | 214 | 0010 | 0001 | 1923.5 | 1919 | −.03 |
| 84 | 0001 | 0001 | 3846.9 | 3871 | .42 | 216 | 1010 | 0010 | 1831.9 | 1855 | .41 |
| 86 | 0001 | 0000 | 3938.5 | 3999 | 1.06 | 218 | 0010 | 0100 | 1740.3 | 1727 | −.23 |
| 88 | 1001 | 0000 | 4030.1 | 3999 | −.55 | 220 | 0010 | 0101 | 1648.7 | 1663 | .25 |
| 90 | 1000 | 1111 | 4121.7 | 4191 | 1.22 | 222 | 1010 | 0111 | 1557.1 | 1535 | −.39 |
| 92 | 0000 | 1111 | 4213.3 | 4191 | −.39 | 224 | 0010 | 1000 | 1465.5 | 1471 | .10 |
| 94 | 0000 | 1111 | 4304.9 | 4191 | −2.01 | 226 | 0010 | 1010 | 1373.9 | 1343 | −.54 |
| 96 | 0000 | 1110 | 4396.5 | 4447 | .89 | 228 | 1010 | 1011 | 1282.3 | 1279 | −.06 |
| | | | | | | 230 | 1010 | 1100 | 1190.7 | 1215 | .43 |

TABLE II-continued

| | Positive Samples | | | | | Negative Samples | | | | |
|---|---|---|---|---|---|---|---|---|---|---|
| ADD | ODD 4321 | EVEN 4321 | NORM. 03 MAG. VALUE | USE | ERROR % | | | | | |
| 98  | 1000 | 1110 | 4488.1 | 4447 | −.72  | 232 | 1010 | 1110 | 1099.1 | 1087 | −.21 |
| 100 | 1000 | 1101 | 4579.7 | 4703 | 2.17  | 234 | 1010 | 1111 | 1007.5 | 1023 | .27  |
| 102 | 0000 | 1101 | 4671.3 | 4703 | .56   | 236 | 1011 | 0010 | 915.9  | 911  | −.09 |
| 104 | 1000 | 1101 | 4762.9 | 4703 | −1.05 | 238 | 1011 | 0101 | 824.3  | 815  | −.16 |
| 106 | 1000 | 1100 | 4854.5 | 4959 | 1.84  | 240 | 0011 | 1000 | 732.7  | 719  | −.24 |
| 108 | 1000 | 1100 | 4946.1 | 4959 | .23   | 242 | 0011 | 1010 | 641.2  | 655  | .24  |
| 110 | 0000 | 1100 | 5037.6 | 4959 | −1.38 | 244 | 1011 | 1101 | 549.6  | 559  | .17  |
| 112 | 1000 | 1011 | 5129.2 | 5215 | 1.51  | 246 | 1100 | 0001 | 458.0  | 455  | −.05 |
| 114 | 0000 | 1011 | 5220.8 | 5215 | −.10  | 245 | 0100 | 0111 | 366.4  | 359  | −.13 |
| 116 | 0000 | 1011 | 5312.4 | 5215 | −1.72 | 250 | 0100 | 1100 | 274.8  | 279  | .07  |
| 118 | 0000 | 1010 | 5404.0 | 5471 | 1.18  | 252 | 0101 | 0100 | 183.2  | 187  | .07  |
| 120 | 1000 | 1010 | 5495.6 | 5471 | −.43  | 254 | 0110 | 0000 | 91.6   | 93   | .02  |
| 122 | 0000 | 1010 | 5587.2 | 5471 | −2.05 |
| 124 | 0000 | 1001 | 5678.8 | 5727 | .85   |
| 126 | 1111 | 1111 | .0     | 0    | .00   |
| 128 | 0111 | 1111 | .0     | 0    | .00   |
| 130 | 1111 | 1111 | .0     | 0    | .00   |

A parity generator (not shown) creates a parity bit based on the 1K ROM address and a parity bit (bit 4 of the odd word in Table II) in the ROM. The parity bit and the PCM word are applied to the DATA BUFFER 313 via Bus 329 and are clocked into the TSI bus 26-1 at the appropriate time.

The timer memory will allow a KP digit on the TSI bus for 96 to 104 ms and all other digits for 64 to 72 ms. This then represents the tone on time accuracy (8 ms) of the MFS. Interdigit timing is controlled by the time at which the SC sends out byte 0 and byte 1 for the next tone pair plus the uncertainty in the tone on time.

A study was done to determine the start value (sample number 0) for each frequency that yielded the lowest overall distortion. They are as follows:

| Frequency | Start Value |
|---|---|
| 700 Hz  | +1 |
| 900 Hz  | +1 |
| 1100 Hz | −1 |
| 1300 Hz | −1 |
| 1500 Hz | +1 |
| 1700 Hz | +1 |

This stems from the fact that some encoding errors will tend to cancel (when 2 samples are added together) more than other errors will reinforce depending on the start phase of each frequency.

An exemplary flow chart for the operation of the processor 304 is shown in FIG. 14 and will be explained in conjunction with FIG. 10. States 1 through 6 in FIG. 12 show the processing steps for outputting data on each of the 16 MF channels.

In state 0, the Processor 304 will determine by decision variable ISA 16 (input signal address 16) when the tone output interval occurs during the frame. As previously described, the MF sender will send out MF tone signals during the first 16 D3 time slots. If ISA 16 is No, the Processor goes to state 1 and continues to state 2.

At state 2, the Processor will load the 6 bit FA tone sample into the Sample Encoder 309 from Digit Memory 307. The Processor will then determine whether the Timer memory 308 needs incrementing by decision variable (not Time Out) and 8 ms. If Yes, the Processor will continue to state 3 to increment the Timer Memory. This occurs once every 8 ms on channels that have not timed out. If No, the Processor will continue to state 4.

In states 3 and 4, the processor will select the FB tone sample for loading into the Sample Encoder 309. The processor will determine by decision variable IBL (input buffer load) if the composite sample has been loaded into the data buffer 313. If No, the Processor will return to state 4. If Yes, the Processor will continue to state 5 to check ISA 16 and determine whether the SC processing interval during the frame has started. If No, the Processor returns to state 2. If Yes, the Processor continues to state 6.

At state 6, the Processor will increment the 8 ms counter and the 21 state Up/Down counter. The Processor at state 6 will determine by decision variable DR (digit ready) whether the UART 302 has a byte ready from the SC. If No, the Processor returns to state 0. If Yes, the Processor continues to state 7 to determine whether the UART 302 contains byte 0 as seen in FIG. 9.

If Byte 0 is Yes, the Processor goes to state 16 and loads the MFS channel number from the SC and the error data into Channel Buffer 306. The Processor will go to state 14 and 15 where the UART receive logic is reset. Note that a NO-GO is only sent in state 14 when preceded by Enable THRL (state 17) The Processor then returns to state 0 where the cycle starts again.

It takes several hundred microseconds to transmit a byte. Therefore, the Processor 304 will do the state 0-6 loop several times before the next byte arrives from the SC. When the DR flag goes up to indicate another byte from the SC, the Processor goes to state 7. This time the byte 0 decision should be No, directing the Processor to state 8.

In state 8, an error detector is checked for 4 types of errors—a byte 0 error, the requested channel has not time out, UART errors, and byte 1 errors. Any error will cause a jump to state 17 where control variable Enable THRL will initiate a subroutine to return a message to the SC in a NO-GO format.

If no errors occur, the Processor continues from state 8 to state 9 in which the FA data is loaded properly into Digit Memory 307. If the FA data is not loaded properly, (decision variable FAC) the processor goes to state 17. If FA data is loaded properly, the Processor goes to state 10.

At state 10, the Processor will write the FB data into digit Memory 307. If the FB data is not loaded properly (FAB) the Processor will go to state 17. If Properly loaded the Processor goes to state 11, where the timer memory is preset. Also, Enable THRL is initiated and a GO response is sent to the SC.

The Processor goes to state 12 in which it will increment the Timer Memory.

The Processor will determine by decision variable PC (preset compare) whether the Timer Memory 308 is preset and cycles once properly. If Yes, the processor goes to state 14. If No, the processor goes to state 13 where it stores a timer error flag in the digit memory 307. Depending on when the timer is preset with respect to the 8 ms increment, it will take 12 to 13 8ms-intervals or 96 to 104 ms for a KP digit. Similarly, it will take 8 to 9 8 ms-intervals or 64 to 72 ms for all other digits.

The multifrequency pulsing (MF) system consits of transmitting and receiving equipment for transferring valid number information over telephone trunks by various combinations of two, and only two, of five frequencies in the voice band. Each combination of two frequencies represents a digit. The digits are digitally encoded into PCM code for transmission along a T1 line for switching through a digital switch. MF receivers detect the digits and transfer the digital information to control equipment which establishes connection through the switches. MF pulsing is also used to transmit calling number information in CAMA-ANI (centralized automatic message accounting—automatic number identification) operation. In this case, the calling number is MF pulsed forward in PCM digital format from the originating office to the CAMA office following the forwarding of a called number whether the called number is transmitted in MF or dial pulsing. Referring now to FIG. 2, the 24 channel times of a D3 frame are used as follows: the first 8 channel times are ignored except for parity checking. The last 16 are used as multifrequency receiver (MFR) channel numbers 1 through 16, respectively. In the timing figure, the MFR channel numbers are allotted to time slots 143, 159, 175, ... 351, 367, 383. Time slots 143, 159, 175, 191, 207, 223, 239 and 255 are shared between the MFS and the MFR. The system controller (SC) has the option of assigning any one of the middle 8 channel times of the D3 frame (time slots 143, 159, ... 255) to the MFS or MFR (but not both). Therefore, the maximum number of senders and receivers that can be used at any one time ranges from 8 senders and 16 receivers to 16 senders and 8 receivers. The particular combination of MFS and MFR during the D3 frame would be dependent upon traffic conditions.

The operation of the MFR will now be described in conjunction with the call processing overview described previously. In the overview, an example was described in which a calling party initiates a 1+ DDD call in which the SC initiates calling number identification by activating the CAMA-ANI sybsystem. The SC assigns the MFR to a time slot in the D3 frame corresponding to the time slot occupied by the 1+ originating trunk. The calling number information in CAMA-ANI pulsing format will consists of a KP signal (MF frequencies 1100 + 1700) which is a preparatory signal for digits; an information digit "I" meaning the automatic identification of the calling number has been done in the originating office; the 7 digit calling number in MF format; and the ST signal (MF signals at 1500 + 1700 Hz), signifying end of the pulsing sequence.

In FIG. 12, the MF receiver 14 of FIG. 1 is shown in more detail. The MFR 14 accepts data in assigned D3 time slot in the normal PCM format (8 bits plus parity) which has further been encoded compatible with the standard D3 decode transfer characteristic. The MFR accepts the PCM data from the TSI bus 28-1 via conventional line receiver 429 and bus 32 and is loaded into the Input Buffer 402. A parity generator (not shown) checks for parity errors. Parity is recomputed and applied to the Sample Memory with the data.

The Sample Memory 404 is a 4K (K = 1024) × 9 bit random access memory (RAM). It is used in halves by the Read/Write Control 405, a typical selector circuit to insure that one half of the memory is being written while the other half is being read out.

It takes 16 ms to reliably detect tones in the MF band. Therefore, this requires writing 128 samples for each of the 16 MFR channels (one sample for each of the channels is written in 125 us). Therefore, the other memory half must be read out for processing in the same time so that the memory halves may be swapped at the end of the period (data currently being written would be read out during the next 16ms). This allows one ms per channel of processing time.

The 128 samples for 1 channel are read out in 497 us therefore leaving 503 us for resetting the analog circuitry. All 16 channels are read out in this manner into the Output Buffer 406 via Bus 414. The data is read out of the Sample Memory 404 at about 32 times the input rate (a ratio of 16 ms/497 us). Specifically, the frequency multiplication ratio of the tones on a channel is given by $R = Ti/To = 125(6 (1/1.544)) = 32.167$ where R = frequency multiplication ratio; Ti = input sample period (125 us);

and To = output sample period (6 T1 Bit times).

The basic read cycle takes 8 frames (1 ms). Assume the switches are as shown in FIG. 12 and the conventional Read Channel Counter 407 has just started channel 0. MFR channel 0 data is selected from sample memory B by Read/Write Control 405 via bus 430. All the data stored in channel 0 (128 samples) is read out in the order in which it arrived and clocked into the 9 bit Output Buffer 406 at 3.89 us per sample. This takes about 497 us. The other 503 us is in idle time. At the end of this period the Read/Write Control 405 alerts the processor 409 via Bus 410 that it is finished with a read cycle. The Processor 409 contains program instructions and its operation will be described subsequently in conjunction with FIG. 15, which shows an exemplary flowchart for the Processor. The Processor 409 then waits for a frame pulse from the Output Timing Generator 408. The Generator 408 receives phase 2 timing signals from the Master Clock and applies appropriate signals to the MFR subsystems via Bus 411. At this time the Processor 409 resets the Read/Write Control 405 via Bus 415 and increments the conventional Read Channel Counter 407 by 1. A read cycle is performed on channel 1. This process continues until the Read Channel Counter 407 reaches a count of 15 and its read cycle is completed. At this point the Counter 407 rolls over to 0 and changes the position of the switches 412, 413 to the opposite state. Now sample memory A is read while sample memory B is written with new incoming data.

During the 16 ms read cycle outlined above, the opposite sample memory is being written with incoming data. The Read/Write Control 405 performs the following write sequence: the first 8 words of the first frame are ignored; the last 16 words are written into memory locations channel 8, sample 0 through channel 15, sample 0 respectively; the first 8 words of the next frame are ignored; the last 16 words are written into locations channels 0, sample 1 through channel 15, sample 1 respectively. This process continues until sample 127 is written for channels 0 through 15. At this time the 16 ms read cycle of the other memory is completed and the memories will again be swapped.

The 128 sample burst (497 us) present at the output buffer is applied to the Digital-To-Analog Converter (DAC) 420 via Bus 419. In addition, the 128 sample burst is applied to the Quench Control 421 and a Parity Checker (not shown).

The Quench Control 421 includes a sample counter and comparator for resetting the Automatic Gain Control (AGC) 422 via Bus 450 to its minimum gain by gating in the Idle Tone Generator (ITG) 423 which includes an LC filter to provide an idle tone to AGC 422 during quench. This forces the AGC 422 to have an initial condition of minimum gain at the time the Quench Control 421 goes to 0 and data starts. The forcing of minimum gain initially allows the AGC to slew gradually in the direction of increasing gain toward steady state gain. Without the ITG 423, the AGC 422 would settle at maximum gain during the no tone interval. Thus with an initial condition of maximum gain and a high level signal occurring, the AGC would output a full scale step function tone burst which would contain frequency components above the necessary threshold for worst case detection of minimum level tones. The Quench Control also sets the filter detector 424 to its initial conditions.

A parity checker (not shown) looks at the data at the DAC 420 input and checks for errors that may have occurred in the memory process. If an error is found, the processor sends an error message to the system controller on bus 38 via the FIFO 427 and UART 428.

The DAC 420 output is an analog tone burst 497 us long containing frequency components 32 times the frequency at the MFR input. This tone burst is applied to the Filter Detector 424, a passive LC filter circuit, via an AGC 422.

The AGC 422 and Filter Detector 424 are gated by the quench control 421. During the 503 us idle time, the Quench control 421 is reset by the Read/Write Control 405 which in turn holds the AGC 422 at minimum gain and discharges the Filter Detector 424 to its start state.

At the end of the idle time, the Quench Control 421 is released. Samples for the next channels start appearing at the Output Buffer 406. As soon as the Quench Control 406 sees 3 samples greater than or equal to −24 dBm, it releases the AGC 422 and Filter Detector 424. The AGC adjusts its gain for a 0 dBm output. It is capable of this output over a +3 dBm to −22 dBm input range with respect to a digital milliwatt reference level.

The MF receiver is capable of a sensitivity of −22 dBm per frequency. A −22 dBm tone in digital PCM format will have about 53 out of 128 samples above a −24dBm threshold. The processor uses this information to reject data via the Sc > 52 Bus 452 from quench Control 421.

The DAC 420 output is applied to the FILTER DETECTOR 424 via Bus 454. DETECTOR 424 contains 6 band-pass filters tuned to 32 times the MF frequencies. Thus, the DETECTOR 424 is tuned to frequencies 22.5 KHZ (700), 28.9 KHZ (900), 35.4 KHZ (1100), 41.8 KHZ (1300), 48.2 KHZ (1500), 54.7 KHZ (1700).

The detector threshold is set at about −8 dBm with respect to the AGC output. Therefore any tone within the filter pass band (± 2%) and above −8 dBm at the AGC output will be present at the X/6 Bus 451 of the FILTER DETECTOR 424 at the end of a full tone burst. The AGC 422 supplies a constant amplitude to the DETECTOR 424 as lone as the DAC output is within the specified dynamic range of the receiver. The AGC 422 is tested at assembly to assure 0 dBm output for signals between −22 dBm and 0 dBm inputs.

Any tones in the MF bands and with the specified level will appear as a digital "X/6" code, at the FILTER DETECTOR output on Bus 451 if the tones last the full 497 Us. The READ/WRITE CONTROL 405 informs the PROCESSOR 409 when the 497 Us data burst is complete. The processor inspects the X/6 data line 451 for any data present. If data is present and more than 52 of the 128 samples are above the predetermined threshold in the QUENCH CONTROL 421, the X/6 data is added to the contents of the TONE MEMORY 425 at this channel number. Tone memory 425 is a 16 × 7 bit memory.

16 ms later, when this channel comes up again, data from the new tone burst will be added to the TONE MEMORY 425. This process continues until a tone burst produces no data or less than 53 out of 128 samples were above the digital threshold. This constitutes an interdigital period so the PROCESSOR 409 sends the channel number and the total contents of the TONE MEMORY 425 for this channel number to the SC via the BYTE SELECT 426, FIFO 427 and UART 428. The TONE MEMORY is then cleared to accept new data. In FIG. 13, the MFR byte format is shown for transmission to the SC, with byte 0 indicating which one or two of the six tones is present and byte 1 indicating which of the 16 MFR channel numbers 0-15 on which data was received (channels 9-24 of D3 format). The FIFO is a holding buffer to accommodate slow transmission rate of the UART. The 64 × 8 bit FIFO holds 32 2-byte messages (channel number plus data) as seen in FIG. 13. The UART 428 can send to the SCl byte every 3 ms, but the PROCESSOR 409 may load as many as 32 bytes in a 16 ms period. Thus, the FIFO 427 is used as a temporary holding buffer for the UART 428.

As long as tones are detected, data will continue to accumulate in the TONE MEMORY 425 until an interdigital period is detected or a parity error occurs.

The signal being detected has been conditioned sufficiently to assure a high reliability in detection. The MFR disregards any response to fractional tone bursts at the beginning and end of the real tone burst by performing a sample count over threshold, thereby rejecting signals whose amplitude is below the digital threshold of −24 dBmO and rejecting bursts of less than approximately 8 ms duration. Also, the initial spectrum has been cleaned up by eliminating the spectral clobbering the filters would have to take with a normal AGC. Also, an adaptive threshold is used to sense in advance the magnitude of an incoming signal level. This provides for a lower threshold when the input signal is low since the AGC's initial output is low. Also, the maximum signal amplitude that can get to the filters is limited. Thus, an actual tone burst received is conformed to the Bell blue book specifications.

Referring to FIG. 15, an exemplary flow chart is shown for the operation of processor 409 of FIG. 12.

The Processor waits at state 0 until CO (read counter carry out) signals the end of each read cycle. If No, the Processor returns to state 0. If Yes, the Processor goes to state 1.

In state 1, the Processor determines by OFC (output frame compare) whether the next read cycle has started. If No, the Processor returns to state 1. If Yes, the Processor goes to state 3.

In state 3, the Processor resets the Read/Write counters, resets the parity error detector, and resets the FIFO 427 and UART 428 if conditions permit.

The processor continues to state 4 where the tone memory buffer is loaded with the current contents of the Tone Memory 425.

The inputs to Tone Memory 425 via X/6 line 451 should indicate no data since the Quench Circuit 421 is holding the analog receiver in reset at this time.

The Processor continues to state 5 where it waits for the end of the last sample in a read cycle by decision variable DBC (data buffer clear). After the last sample, the Processor goes to state 6.

In state 6, the master reset function for the FIFO 427 and UART 428 is cleared and DP is checked. DP indicates the presence of data from the analog section of the MF receiver.

If DP is No, the Processor goes to state 10 where it checks the status of DR (data ready), which indicates the presence of data in tone memory 425. A No for DP means no tones were detected and it is interpreted as an interdigital period. DR indicates the presence or absence of data in the tone memory. If DR is Yes, an SC message is initiated in State 12. The byte format in state 12 is shown in FIG. 14.

The Processor continues to state 13 where the Tone Memory Buffer is cleared and to state 14 where the Tone Memory 425 is written with all zeros. States 13 and 14 allow enough time between Byte 0 and Byte 1 for proper processing by the FIFO 427.

As state 15, Byte 1 is selected and loaded into the FIFO in the same manner as byte 0. Byte 1 contains the channel number as shown in FIG. 14.

If DR is No in state 10, the Processor continues to state 11 where it checks the parity error status. If parity error exists, the Processor branches to the SC message sequence in state 12. Otherwise it returns to state 0. The sequence from states 6 to 10 to 11 to 0 is the normal routine when no tones are being received from the TSI 21 of FIG. 1.

If DP is high in state 6, the Processor goes to state 7 where it checks the status of the sample count. If the sample count is less than 53, the data is rejected and interpreted as an interdigital period. The processor goes to state 10 and proceeds as above.

If the sample count is greater than 52, the Tone Memory Buffer is clocked again in state 8. The new incoming data from the analog section of the MF receiver is combined with the current data from the Tone Memory 425 and loaded into the Tone Memory Buffer.

In state 9, the updated data is written back into the Tone Memory 425.

The Processor continues to state 11 where the parity status is checked as described above. As long as tones are detected by the MF receiver, data will continue to accumulate in the Tone Memory 425 until an interdigital period is detected or a parity error occurs.

What is claimed is:

1. In a telephone system having an interface including an input portion connected to a multitime slot input bus for receiving input telephone signals and having an output portion connected to a multitime slot output bus for transmitting output telephone signals, said system operating with the telephone signals in time frames each consisting of a plurality of time slots, the apparatus comprising:

sender means connected to said input bus for generating and connecting selected tone signals in pulse code modulated format representative of a multifrequency tone pair to selected ones of said time slots on said input bus, receiver means connected to said output bus, said receiver means responsive to the presence of other tone signals in pulse code modulated format representative of a multifrequency tone pair in selected others of said time slots on said output bus, thereby providing a data signal representative of one of said tone pairs, means for connecting said input portions to said output portions whereby said input telephone signals become output telephone signals, and system controller means for specifying said selected tone signals, said selected ones of said time slots and for receiving said data signal whereby some of said selected ones and others of said time slots are dedicated to sending and receiving tone signals, respectively, and some are available for either sending or receiving tone signals.

2. A system as in claim 1 wherein said sender means includes sample encoder means for storing a plurality of coded pulse code modulated samples representative of each individual tone of said multifrequency tone pairs, means connected to said sample encoder means for reading out sequentially first and second samples from said encoser means representative of a first multifrequency tone and a second multifrequency tone, adder means connected to receive said first and second samples for adding said samples thereby forming a composite signal representative of a multifrequency tone pair, and processor means for controlling the operation of said sender means.

3. A system as in claim 2 wherein said means for reading out include digit memory means for storing first and second signals representative of a combination of said tone pair whereby said digit memory means addresses said encoder means at locations corresponding to said individual tones and counter means incrementable from an initial count to a predetermined count for sequentially reading out a particular sample from said locations at a particular count.

4. A system as in claim 2 wherein said receiver means includes channel buffer means for storing a signal representative of the time slot in which the tone pair is to be sent, address select means responsive to said channel buffer means for addressing said digit memory means during the time slot in which the tone pair is to be sent whereby said digit memory means addresses said encoder means at a location corresponding to said first and second signals.

5. A system as in claim 4 further including pulse code modulated encoder means for storing a plurality of companded pulse code modulated samples where each of said samples has a corresponding sample in said composite signal wherein said adder means addresses the corresponding location in said encoder means to read out a companded sample.

6. A system as in claim 4 including output data buffer means connected to said encoder means for storing said companded samples and for connecting said samples to said time slots and timer memory means for enabling said buffer means only during a specified interval for each time slot.

7. A system as in claim 1 where said time have a time slot rate and wherein said receiver means includes sample memory means for storing a plurality of sequential pulse code modulated samples for each of said selected others of said time slots at a storage rate corresponding to said time slot rate, control means for controlling the writing of said samples into said memory means at said storage rate and the reading of said samples from said memory means at a faster rate than said storage rate thereby multiplying said storage rate by said faster rate, output buffer means connected to receive said samples for storing said samples at said faster rate, and analog receiver means for detecting multifrequency tones represented by said pulse code modulated samples multiplied by said faster rate, said analog means including quench control means for counting the numbers of samples above a predetermined threshold within a predetermined time for enabling said analog receiver means when a number of said samples occur above said predetermined threshold within said predetermined time.

8. A system as in claim 7 wherein said receiver means includes
processor means for controlling the operation of said receiver means, and
read/write control means responsive to said processor means for writing said samples into said memory means and reading said samples out of said memory means.

9. A system as in claim 7 wherein said analog means includes digital to analog converter means for converting said samples to an analog signal representative of said faster rate, automatic gain control means responsive to said quench control means for adjusting its gain for a predetermined output level, filter detector means for detecting an analog tone representative of a multifrequency digit, at said faster rate, tone memory means for storing said signal representative of said digit, and byte selector means for selecting said signal representative of said digit.

10. In a pulse code modulated message accounting system for sending and receiving multifrequency tone signals, said system having an interface including an input portion connected to an input bus for receiving input telephone signals and having an output portion connected to an output bus for transmitting output signals, said system operating with the telephone signals in time frames each consisting of a plurality of time slots, the apparatus comprising:

sender means connected to said input bus for generating and connecting selected tone signals in pulse code modulated format representative of a multifrequency tone pair to a first group of said time slots, receiver means connected to said output bus responsive to the presence of other tone signals in pulse code modulated format representative of a multifrequency tone pair in selected others of said time slots thereby providing a data signal representative of one of said tone pairs, means for connecting said input portions to said output portions whereby said input signals become output signals, and system controller means for specifying said selected tone signals, for specifying said selected ones of said time slots and for receiving said data signal whereby some of said selected ones and others of said time slots are dedicated to sending and receiving tone signals, respectively, and some are available for either sending or receiving tone signals.

* * * * *

UNITED STATES PATENT AND TRADEMARK OFFICE
CERTIFICATE OF CORRECTION

PATENT NO. : 4,133,979

DATED : January 9, 1979

INVENTOR(S) : Bradley A. Helliwell et al.

It is certified that error appears in the above–identified patent and that said Letters Patent are hereby corrected as shown below:

Column 26, line 50, "receiver" should read -- processor --.

Signed and Sealed this

Twenty-fourth Day of July 1979

[SEAL]

Attest:

LUTRELLE F. PARKER

Attesting Officer   Acting Commissioner of Patents and Trademarks